(12) United States Patent
Ko et al.

(10) Patent No.: US 9,456,440 B2
(45) Date of Patent: Sep. 27, 2016

(54) METHOD AND DEVICE FOR PROVIDING CONTROL INFORMATION FOR UPLINK TRANSMISSION IN WIRELESS COMMUNICATION SYSTEM SUPPORTING UPLINK MULTI-ANTENNA TRANSMISSION

(71) Applicant: LG ELECTRONICS INC., Seoul (KR)

(72) Inventors: Hyun Soo Ko, Anyang-si (KR); Moon Il Lee, Anyang-si (KR); Jae Hoon Chung, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/852,913

(22) Filed: Sep. 14, 2015

(65) Prior Publication Data
US 2016/0021651 A1    Jan. 21, 2016

Related U.S. Application Data

(63) Continuation of application No. 13/580,758, filed as application No. PCT/KR2011/001267 on Feb. 23, 2011, now Pat. No. 9,166,661.

(60) Provisional application No. 61/306,969, filed on Feb. 23, 2010, provisional application No. 61/320,763, filed on Apr. 4, 2010, provisional application No. 61/321,086, filed on Apr. 5, 2010.

(51) Int. Cl.
*H04W 48/08* (2009.01)
*H04W 72/04* (2009.01)
(Continued)

(52) U.S. Cl.
CPC .......... *H04W 72/0413* (2013.01); *H04B 7/04* (2013.01); *H04B 7/0456* (2013.01);
(Continued)

(58) Field of Classification Search
None
See application file for complete search history.

(56) References Cited

U.S. PATENT DOCUMENTS 8,797,950 B2 *   8/2014   Chen ............... H04L 5/0023
                                                   370/329
2005/0141560 A1   6/2005   Muthiah
(Continued)

FOREIGN PATENT DOCUMENTS

WO    2009096730    8/2009
WO    2009/123522   10/2009

OTHER PUBLICATIONS

TSG RAN WG1, "CRs to 36.201, 36.211, 36.212 & 36.213 for editorial corrections and addition of short latency feature to LTE," TSG-RAN Meeting #46, RP-091177, Dec. 2009, 1 page.
(Continued)

*Primary Examiner* — Kevin C Harper
*Assistant Examiner* — Derrick V Rose
(74) *Attorney, Agent, or Firm* — Lee, Hong, Degerman, Kang & Walmey; Jonathan Kang; Michael Monaco

(57) ABSTRACT

The present invention relates to a wireless communication system, and more particularly, a method and device for providing control information for uplink transmission in a wireless communication system supporting uplink multi-antenna transmission. An uplink multi-antenna transmission scheduling method, according to one embodiment of the present invention, comprises the following steps: creating downlink control information (DCI) containing respective modulation and coding scheme (MCS) information for a first and a second transport block; transmitting said created downlink control information, which schedules uplink transmissions from one or more of first and second transport blocks through a downlink control channel; and receiving uplink transmission, scheduled according to the downlink control information, through an uplink data channel, wherein one transport block can be disabled, if MCS information for one transport block among of the first or the second transport blocks has a predetermined value.

14 Claims, 16 Drawing Sheets

(51) Int. Cl.
  *H04L 5/00*   (2006.01)
  *H04B 7/04*   (2006.01)
  *H04L 1/00*   (2006.01)
  *H04W 72/10*  (2009.01)
  *H04W 72/12*  (2009.01)
  *H04W 88/02*  (2009.01)
  *H04W 88/08*  (2009.01)

(52) U.S. Cl.
  CPC .......... *H04L 1/0003* (2013.01); *H04L 5/0053* (2013.01); *H04W 72/0406* (2013.01); *H04W 72/0446* (2013.01); *H04W 72/10* (2013.01); *H04W 48/08* (2013.01); *H04W 72/12* (2013.01); *H04W 88/02* (2013.01); *H04W 88/08* (2013.01)

(56) References Cited

U.S. PATENT DOCUMENTS

| | | |
|---|---|---|
| 2009/0196262 A1 | 8/2009 | Chin et al. |
| 2009/0225737 A1 | 9/2009 | Kim et al. |
| 2009/0238298 A1 | 9/2009 | Kim et al. |
| 2009/0257408 A1 | 10/2009 | Zhang et al. |
| 2010/0034303 A1 | 2/2010 | Damnjanovic et al. |
| 2010/0165931 A1 | 7/2010 | Nimbalker et al. |
| 2010/0303016 A1 | 12/2010 | Jin et al. |
| 2010/0323709 A1* | 12/2010 | Nam .................. H04L 5/0051 455/450 |
| 2011/0035639 A1* | 2/2011 | Earnshaw ............ H04L 1/1812 714/748 |
| 2011/0085507 A1 | 4/2011 | Jongren |
| 2014/0016602 A1 | 1/2014 | Papasakellariou et al. |
| 2014/0219213 A1 | 8/2014 | Ko et al. |

OTHER PUBLICATIONS

Qualcomm Incorporated, "UL grants for MIMO transmissions," 3GPP TSG-RAN WG1 #60, R1-101493, Feb. 2010, 3 pages.

Samsung, "Further Discussions on UL MIMO Signaling requirements," 3GPP TSG RAN WG1 #61, R1-103322, May 2010, 4 pages.

Texas Instruments, "Transmission Modes and Signaling for UL MIMO," 3GPP TSG RAN WG1 61, R1-102826, May 2010, 5 pages.

Samsung, "Details on DCI Format 4," 3GPP TSG RAN WG1 #63, R1-106040, Nov. 2010, 5 pages.

The State Intellectual Property Office of the People's Republic of China Application Serial No. 201180020040.7, Office Action dated Sep. 16, 2014, 6 pages.

The State Intellectual Property Office of the People's Republic of China Application Serial No. 201180020040.7, Office Action dated Mar. 31, 2015, 6 pages.

ZTE, "DL Control Signaling for Dual-Layer BF in LTE Rel-9," 3GPP TSG RAN WG1 Meeting #58, R1-093191, Aug. 2009, 5 pages.

PCT International Application No. PCT/KR2011/001270, Written Opinion of the International Searching Authority dated Oct. 27, 2011, 17 pages.

U.S. Appl. No. 13/580,357, Notice of Allowance dated May 28, 2014, 16 pages.

* cited by examiner (a)

(b)

(a)

(b)

METHOD AND DEVICE FOR PROVIDING CONTROL INFORMATION FOR UPLINK TRANSMISSION IN WIRELESS COMMUNICATION SYSTEM SUPPORTING UPLINK MULTI-ANTENNA TRANSMISSION

CROSS-REFERENCE TO RELATED APPLICATIONS

This application is a continuation of U.S. patent application Ser. No. 13/580,758, filed on Aug. 23, 2012, now U.S. Pat. No. 9,166,661, which is the National Stage filing under 35 U.S.C. 371 of International Application No. PCT/KR2011/001267, filed on Feb. 23, 2011, which claims the benefit of U.S. Provisional Application No. 61/306,969, filed on Feb. 23, 2010, U.S. Provisional Application No. 61/320,763, filed on Apr. 4, 2010, and U.S. Provisional Application No. 61/321,086, filed on Apr. 5, 2010, the contents of which are all incorporated by reference herein in their entirety.

TECHNICAL FIELD

The present invention relates to a wireless communication system, and more particularly, to a method and apparatus for providing control information for uplink transmission in a wireless communication system supporting uplink multi-antenna transmission.

BACKGROUND ART

Single Carrier-Frequency Division Multiple Access (SC-FDMA) is employed as an uplink multiple access scheme in the 3$^{rd}$ Generation Partnership Project Long Term Evolution (3GPP LTE) standard (e.g. release 8 or 9). Introduction of clustered Discrete Fourier Transform-spread-Orthogonal Frequency Division Multiplexing (DFT-s-OFDMA) as an uplink multiple access scheme is under discussion in the 3GPP LTE-Advanced (LTE-A) standard (e.g. release 10) being an evolution of the 3GPP LTE standard. Uplink/downlink transmission in a single carrier band is supported in the 3GPP LTE standard and uplink transmission through a plurality of carriers (i.e. carrier aggregation) is under discussion in the 3GPP LTE-A standard. In addition, while the 3GPP LTE standard support uplink transmission from a User Equipment (UE) through a single Transmission (Tx) antenna, the 3GPP LTE-A standard discusses support of uplink transmission from a UE through a plurality of Tx antennas (uplink multi-antenna transmission) in order to increase uplink transmission throughput.

Multi-antenna transmission is also called Multiple Input Multiple Output (MIMO). MIMO can increase the efficiency of data transmission and reception using multiple Tx antennas and multiple Reception (Rx) antennas. MIMO schemes include spatial multiplexing, transmit diversity, beamforming, etc. A MIMO channel matrix formed according to the number of Rx antennas and the number of Tx antennas can be decomposed of a plurality of independent channels and each independent channel is called a layer or a stream. The number of layers or streams or a spatial multiplexing rate is called a rank.

A multi-transmission stream or multi-layer transmission scheme may be applied to a UE for the purpose of spatial multiplexing, as an uplink multi-antenna transmission technology. This scheme is called Single User-MIMO (SU-MIMO). To maximize the capacity of a transmission channel in uplink SU-MIMO, a precoding weight may be used. This may be referred to as precoded spatial multiplexing.

DISCLOSURE

Technical Problem

An object of the present invention devised to solve the conventional problem is to provide a method for configuring a control signal in order to effectively support uplink multi-antenna transmission. More particularly, the present invention is intended to provide a method for indicating whether an uplink Transport Block (TB) is disabled by control information that schedules uplink multi-antenna transmission and a method for representing precoding information for use in uplink multi-antenna transmission.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for scheduling uplink multi-antenna transmission includes generating Downlink Control Information (DCI) including Modulation and Coding Scheme (MCS) information for each of first and second transport blocks,
transmitting the generated DCI for scheduling uplink transmission of at least one of the first and second transport blocks on a downlink control channel, and receiving an uplink signal scheduled according to the DCI on an uplink data channel. If the MCS information for one of the first and second transport blocks has a predetermined value, the one transport block is disabled.

In another aspect of the present invention, a method for performing uplink multi-antenna transmission includes receiving DCI for scheduling uplink transmission of at least one of the first and second transport blocks on a downlink control channel, and transmitting an uplink signal scheduled according to the DCI on an uplink data channel. The DCI includes MCS information for each of first and second transport blocks and if the MCS information for one of the first and second transport blocks has a predetermined value, the one transport block is disabled.

In another aspect of the present invention, a base station for scheduling uplink multi-antenna transmission includes a transmission module for transmitting a downlink signal to a user equipment, a reception module for receiving an uplink signal from the user equipment, and a processor for controlling the base station including the reception module and the transmission module. The processor is configured to generate DCI including MCS information for each of first and second transport blocks, transmit the generated DCI for scheduling uplink transmission of at least one of the first and second transport blocks on a downlink control channel through the transmission module, and receive an uplink signal scheduled according to the DCI on an uplink data channel through the reception module. If the MCS information for one of the first and second transport blocks has a predetermined value, the one transport block is disabled.

In a further aspect of the present invention, a user equipment for performing uplink multi-antenna transmission includes a transmission module for transmitting an uplink signal to a base station, a reception module for receiving a downlink signal from the base station, and a processor for controlling the user equipment including the reception module and the transmission module. The processor is configured to receive DCI for scheduling uplink transmission of at least one of the first and second transport blocks on a downlink control channel through the reception module, and transmit an uplink signal scheduled according to the DCI on an uplink data channel through the transmission module. The DCI includes MCS information for each of first and second transport blocks and if the MCS information for one of the first and second transport blocks has a predetermined value, the one transport block is disabled.

The followings may be applied commonly to the embodiments of the present invention.

The predetermined value of the MCS information may be one of a value indicating a lowest modulation order and a smallest transport block size in the MCS information and a value indicating a highest modulation order and a largest transport block size in the MCS information.

The predetermined value of the MCS information may be one of MCS index 0 and MCS index 28.

The MCS information may be 5 bits long.

The downlink control channel may be a Physical Downlink Control Channel (PDCCH) and the uplink data channel may be a Physical Uplink Shared Channel (PUSCH).

The above overall description and a later detailed description of the present invention are purely exemplary and given as an additional description of the present invention determined by the appended claims.

Advantageous Effects

According to the present invention, a method for configuring a control signal to effectively support uplink multi-antenna transmission can be provided. More specifically, a method for indicating whether an uplink TB is disabled by control information that schedules uplink multi-antenna transmission and a method for representing precoding information for use in uplink multi-antenna transmission can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
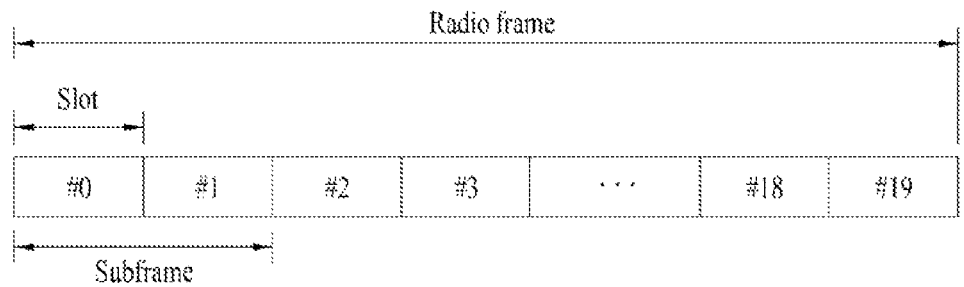
FIG. 1 illustrates the structure of a radio frame in a $3^{rd}$ Generation Partnership Project Long Term Evolution (3GPP LTE) system.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto. For example, the technical features of the present invention are applicable to Orthogonal Frequency Division Multiplexing (OFDM) mobile communication systems (e.g. an IEEE 802.16m or 802.16x system) other than LET-A.

FIG. 1 illustrates a radio frame structure in the 3GPP LTE system. A radio frame is divided into 10 subframes. Each subframe is further divided into two slots in the time domain. A unit time during which one subframe is transmitted is defined as a Transmission Time Interval (TTI). For example, one subframe may be 1ms in duration and one slot may be 0.5 ms in duration. A slot may include a plurality of OFDM symbols in the time domain. Because the 3GPP LTE system adopts OFDMA for downlink, an OFDM symbol represents one symbol period. A symbol may be referred to as an SC-FDMA symbol or symbol period on the uplink. A Resource Block (RB) is a resource allocation unit including a plurality of contiguous subcarriers in a slot. This radio frame structure is purely exemplary and thus the number of subframes in a radio frame, the number of slots in a subframe, or the number of OFDM symbols in a slot may vary.

Figure 2:
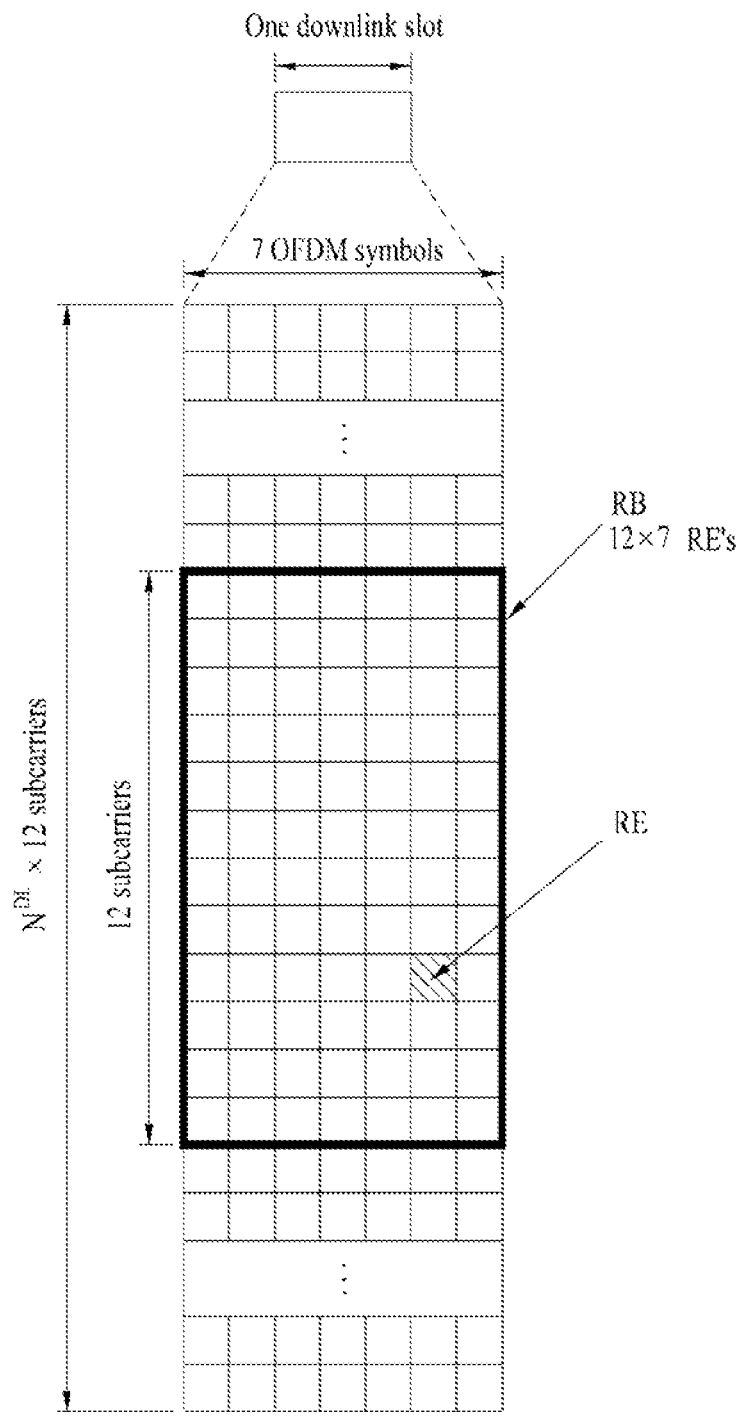
FIG. 2 illustrates the structure of a downlink resource grid for the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot includes 7 OFDM symbols in case of a normal Cyclic Prefix (CP), whereas a downlink slot includes 6 OFDM symbols in case of an extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
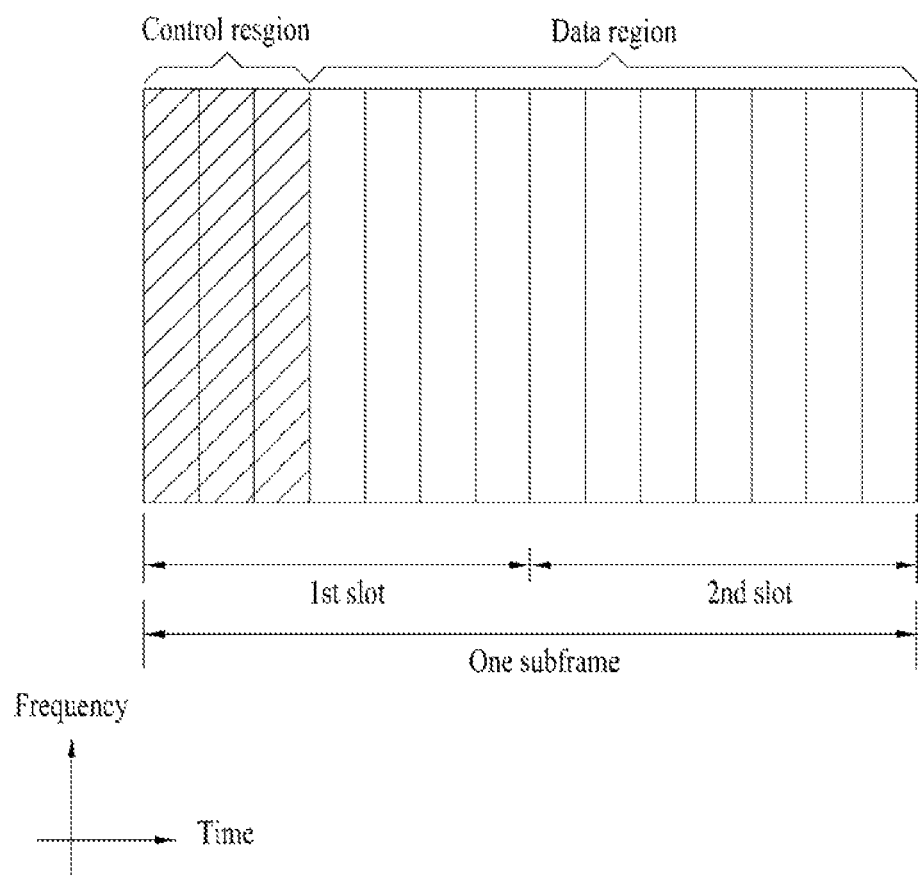
FIG. 3 illustrates the structure of a downlink subframe.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a Physical Downlink Shared Channel (PDSCH) is allocated. Downlink control channels used in the 3GPP LTE system include a Physical Control Format Indicator Channel (PCFICH), a Physical Downlink Control Channel (PDCCH), and a Physical Hybrid automatic repeat request (HARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
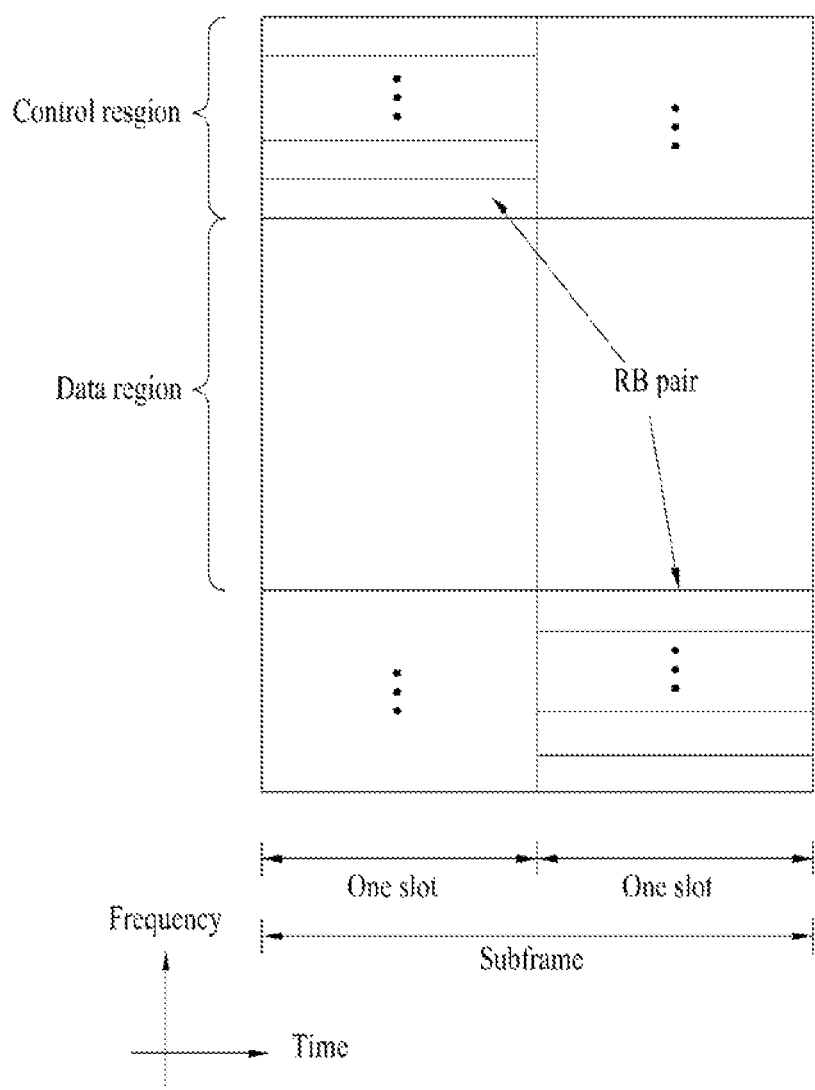
FIG. 4 illustrates the structure of an uplink subframe.

FIG. 4 illustrates an uplink subframe structure. An uplink subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain a single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Uplink Multiple Access Schemes

A description will be given below of uplink multiple access schemes.

First of all, an SC-FDMA transmission scheme will be described. SC-FDMA is also called DFT-s-OFDMA, different from later-described clustered DFT-s-OFDMA.

SC-FDMA is a transmission scheme that keeps a Peak-to-Average Power Ratio (PARP) or Cube Metric (CM) value low and efficiently transmits a signal, avoiding the non-linear distortion area of a power amplifier. PAPR is a parameter representing waveform characteristics, computed by dividing the peak amplitude of a waveform by a time-averaged Root Mean Square (RMS) value. CM is another parameter representing a value that PAPR represents. PAPR is associated with a dynamic range that a power amplifier should support in a transmitter. That is, to support a high-PAPR transmission scheme, the dynamic range (or linear area) of the power amplifier needs to be wide. As a power amplifier has a wider dynamic range, it is more expensive. Therefore, a transmission scheme that maintains a PAPR value low is favorable for uplink transmission. In this context, due to the advantage of low PAPR, SC-FDMA is employed as an uplink transmission scheme in the current 3GPP LTE system.

Figure 5:
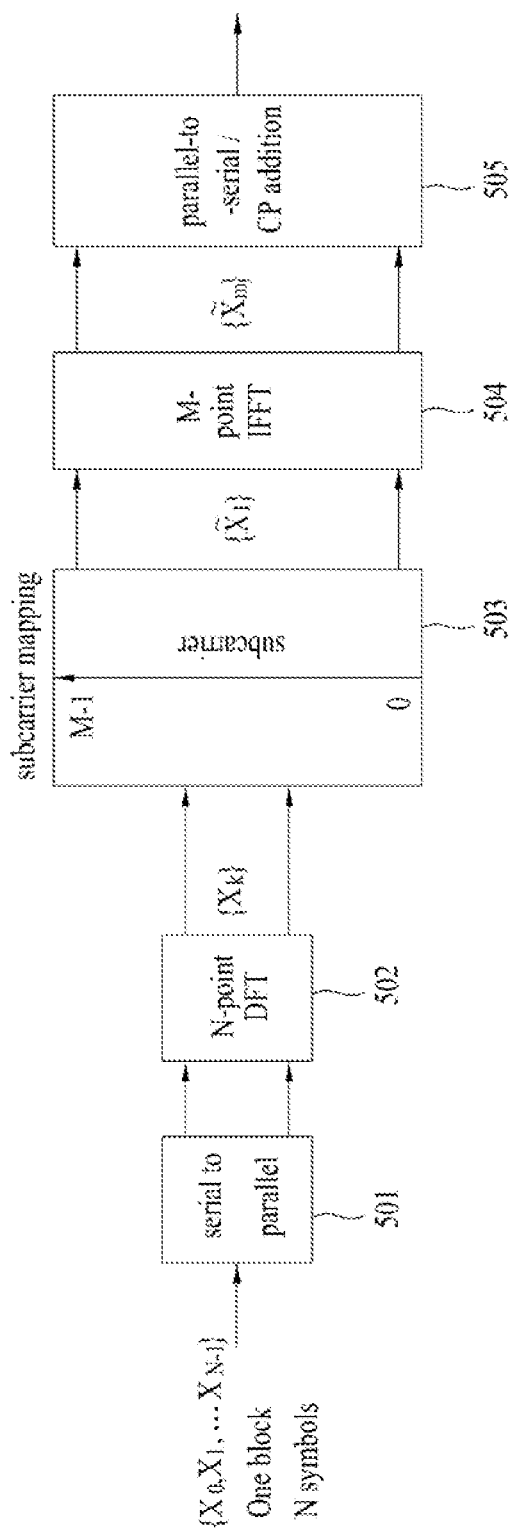
FIG. 5 is a block diagram of a Single Carrier-Frequency Division Multiple Access (SC-FDMA) transmitter.

FIG. 5 is a block diagram of an SC-FDMA transmitter.

A serial-to-parallel converter 501 converts one block of N symbols input to the transmitter to parallel signals. An N-point DFT module 502 spreads the parallel signals and a subcarrier mapping module 503 maps the spread parallel signals to a frequency area. Each subcarrier signal is a linear combination of N symbols. An M-point Inverse Fast Fourier Transform (IFFT) module 504 converts the mapped frequency signals to time signals. A parallel-to-serial converter 505 converts the time signals to a serial signal and adds a CP to the serial signal. The DFT processing of the N-point DFT module 502 compensates for the effects of the IFFT processing of the M-point IFFT module 504 to a certain degree. The signals input to the DFT module 502 have a low PAPR which is increased after the DFT processing. The IFFT signals output from the IFFT module 504 may have a low PAPR again.

Figure 6:
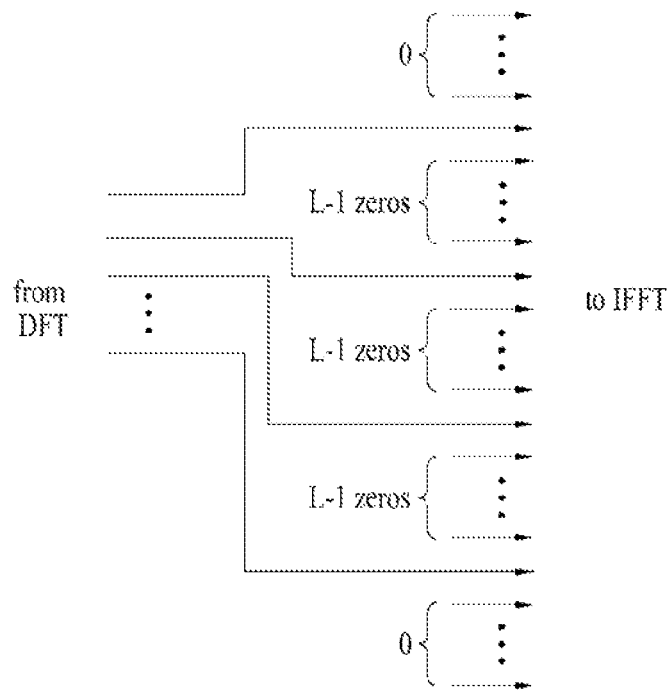
FIG. 6 illustrates methods for mapping signals output from a Discrete Frequency Transform (DFT) module illustrated in FIG. 5 to a frequency area.

FIG. 6 illustrates methods for mapping signals output from the DFT module 502 to a frequency area. A signal output from the SC-FDMA transmitter may satisfy the single carrier property by performing one of two mapping schemes illustrated in FIG. 6. FIG. 6(a) illustrates a localized mapping scheme in which the signals output from the DFT module 502 are mapped only to a specific part of a subcarrier area. FIG. 6(b) illustrates a distributed mapping scheme in which the signals output from the DFT module 502 are distributed across a total subcarrier area. The legacy 3GPP LTE standard (e.g. release 8) uses localized mapping.

Figure 7:
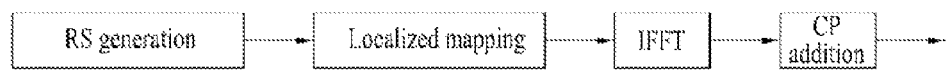
FIG. 7 is a block diagram illustrating DeModulation Reference Signal (DM-RS) transmission in case of SC-FDMA transmission.

FIG. 7 is a block diagram illustrating transmission of a Reference signal (RS) for use in demodulating a signal transmitted in SC-FDMA. According to the legacy 3GPP LTE standard (e.g. release 8), while a time signal of data is converted to a frequency signal by DFT, mapped to subcarriers, IFFT-processed, and then transmitted (refer to FIG. 5), an RS is generated directly in the frequency domain without DFT processing (701), mapped to subcarriers (702), IFFT-processed (703), attached with a CP, and then transmitted.

Figure 8:
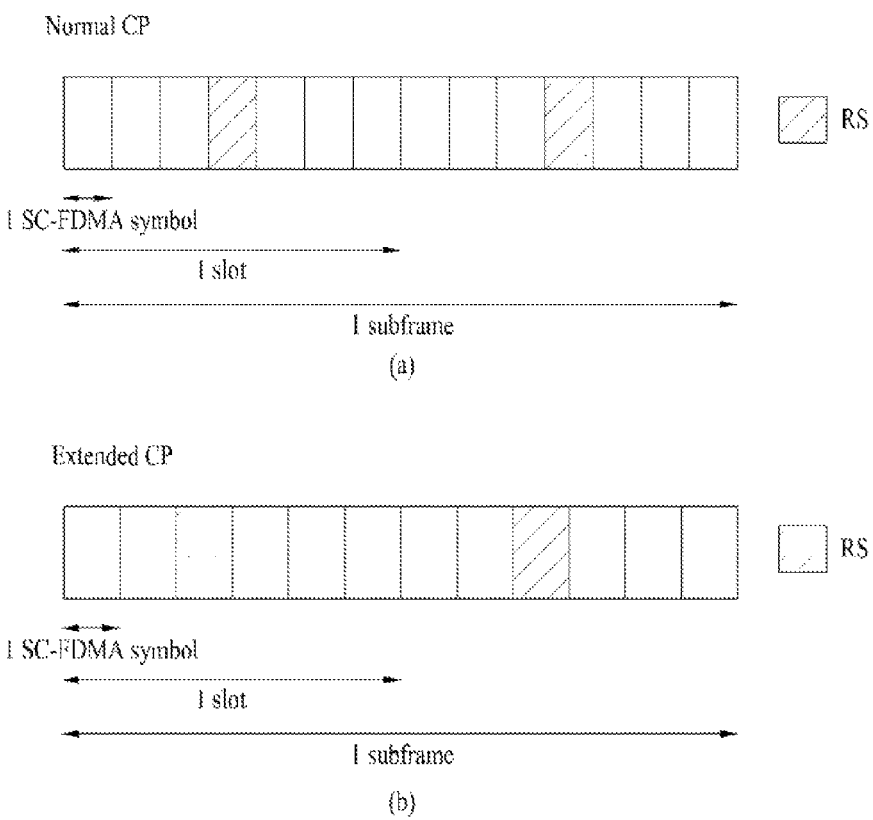
FIG. 8 illustrates the positions of symbols to which RSs are mapped in an SC-FDMA subframe structure.

FIG. 8 illustrates the positions of symbols to which RSs are mapped in an SC-FDMA subframe structure. FIG. 8(a) illustrates a case where an RS is positioned in the $4^{th}$ SC-FDMA symbol of each of two slots in a subframe, when a normal CP is used. FIG. 8(b) illustrates a case where an RS is positioned in the $3^{rd}$ SC-FDMA symbol of each of two slots in a subframe, when an extended CP is used.

With reference to FIGS. 9 to 12, clustered DFT-s-OFDMA will be described. Clustered DFT-s-OFDMA is a modification to the above-described SC-FDMA, in which a DFT signal is divided into a plurality of sub-blocks and mapped to positions apart from each other in the frequency domain.

Figure 9:
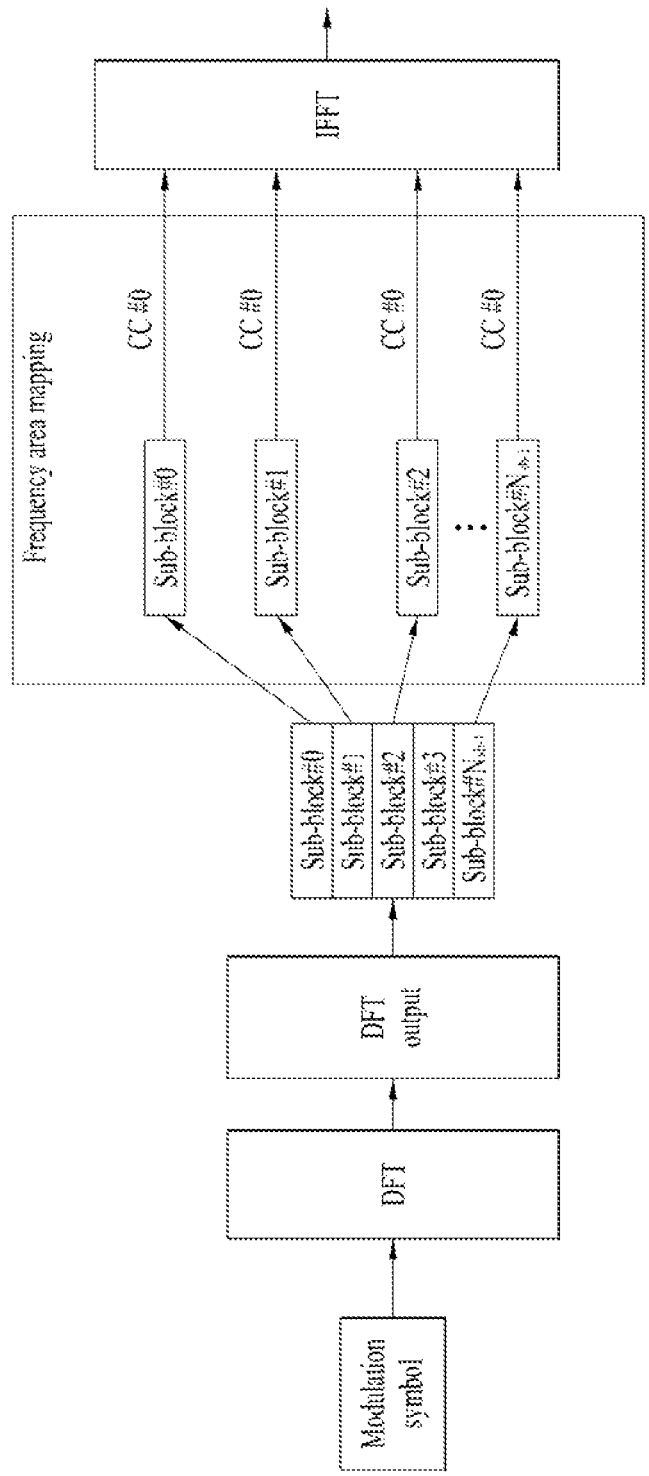
FIG. 9 illustrates a clustered Discrete Frequency Transform-spread-Orthogonal Frequency Division Multiple Access (DFT-s-OFDMA) scheme in a single carrier system.

FIG. 9 illustrates a clustered DFT-s-OFDMA scheme in a single carrier system. For example, a DFT output may be divided in Nsb sub-blocks (sub-block #0 to sub-block #Nsb-1). The sub-blocks, sub-block #0 to sub-block #Nsb-1 are mapped to positions spaced from each other in the frequency domain on a single carrier (e.g. a carrier having a bandwidth of 20 MHz). Each sub-block may be mapped to a frequency area in the localized mapping scheme.

Figure 10:
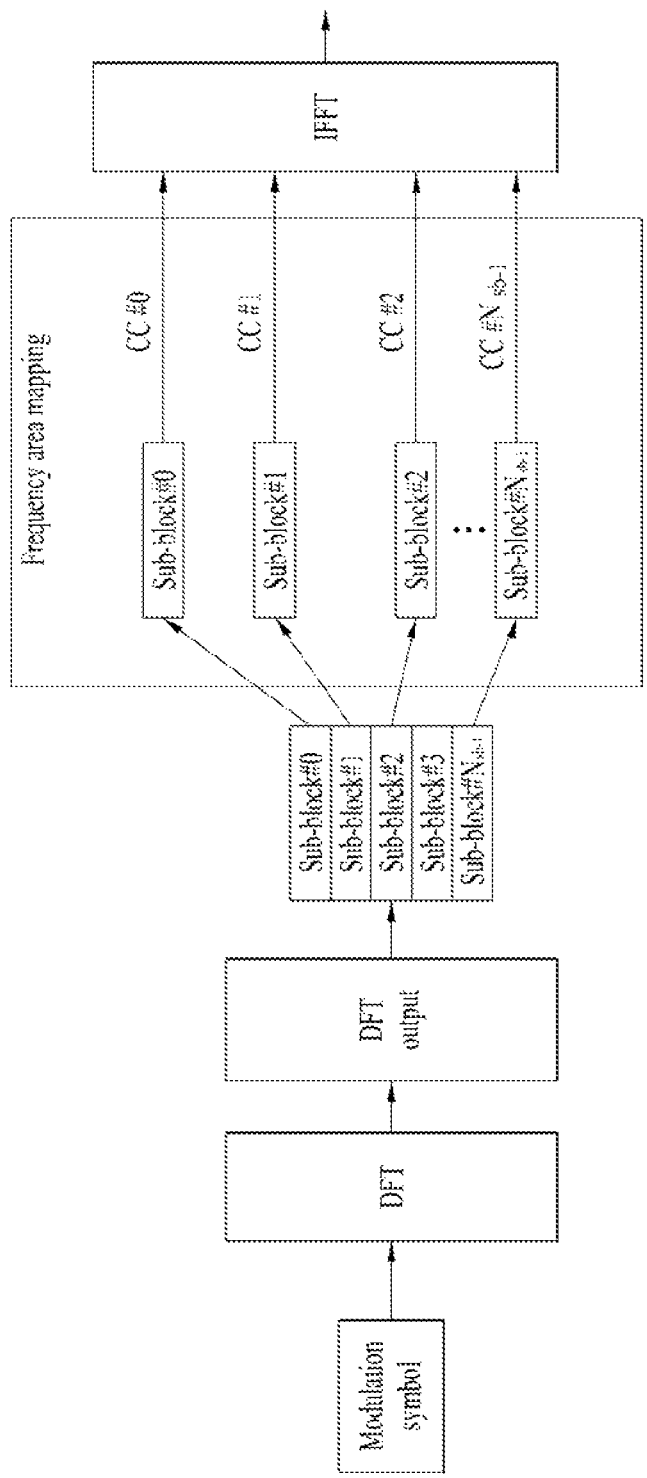
FIGS. 10, 11 and 12 illustrate clustered DFT-s-OFDMA schemes in a multi-carrier system.
Figure 11:
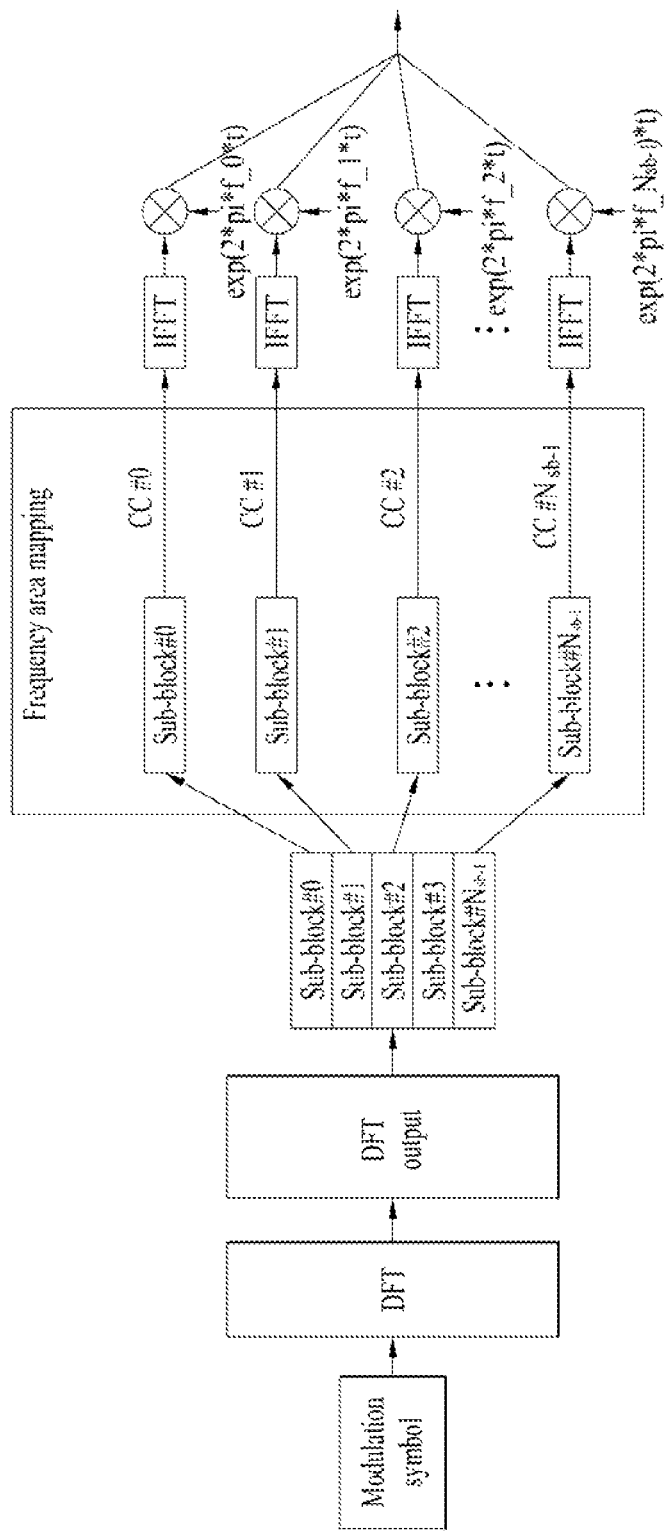

FIGS. 10 and 11 illustrate clustered DFT-s-OFDMA schemes in a multi-carrier system.

FIG. 10 illustrates an example of generating a signal through one IFFT module, when multiple carriers are contiguously configured (i.e. the respective frequency bands of the multiple carriers are contiguous) and a specific subcarrier spacing is aligned between adjacent carriers. For example, a DFT output may be divided into Nsb sub-blocks (sub-block #0 to sub-block #Nsb-1) and the sub-blocks, sub-block #0 to sub-block #Nsb-1 may be mapped, in a one-to-one correspondence, to the Component Carriers (CCs), CC #0 to CC #Nsb-1 (each CC may have, for example, a bandwidth of 20 MHz). Each sub-block may be mapped to a frequency area in the localized mapping scheme. The sub-blocks mapped to the respective CCs may be converted to a time signal through a single IFFT module.

FIG. 11 illustrates an example of generating signals through a plurality of IFFT modules, when multiple carriers are non-contiguously configured (i.e. the respective frequency bands of the multiple carriers are non-contiguous). For example, a DFT output may be divided into Nsb sub-blocks, sub-block #0 to sub-block #Nsb-1 and the sub-blocks, sub-block #0 to sub-block #Nsb-1 may be mapped, in a one-to-one correspondence, to the CCs, CC #0 to CC #Nsb-1 (each CC may have, for example, a bandwidth of 20 MHz). Each sub-block may be mapped to a frequency area in the localized mapping scheme. The sub-blocks mapped to the respective CCs may be converted to time signals through respective IFFT modules.

If the clustered DFT-s-OFDMA scheme for a single carrier illustrated in FIG. 9 is intra-carrier DFT-s-OFDMA, it may be said that the clustered DFT-s-OFDMA schemes for multiple carriers illustrated in FIGS. 10 and 11 are inter-carrier DFT-s-OFDMA. Intra-carrier DFT-s-OFDMA and inter-carrier DFT-s-OFDMA may be used in combination.

Figure 12:
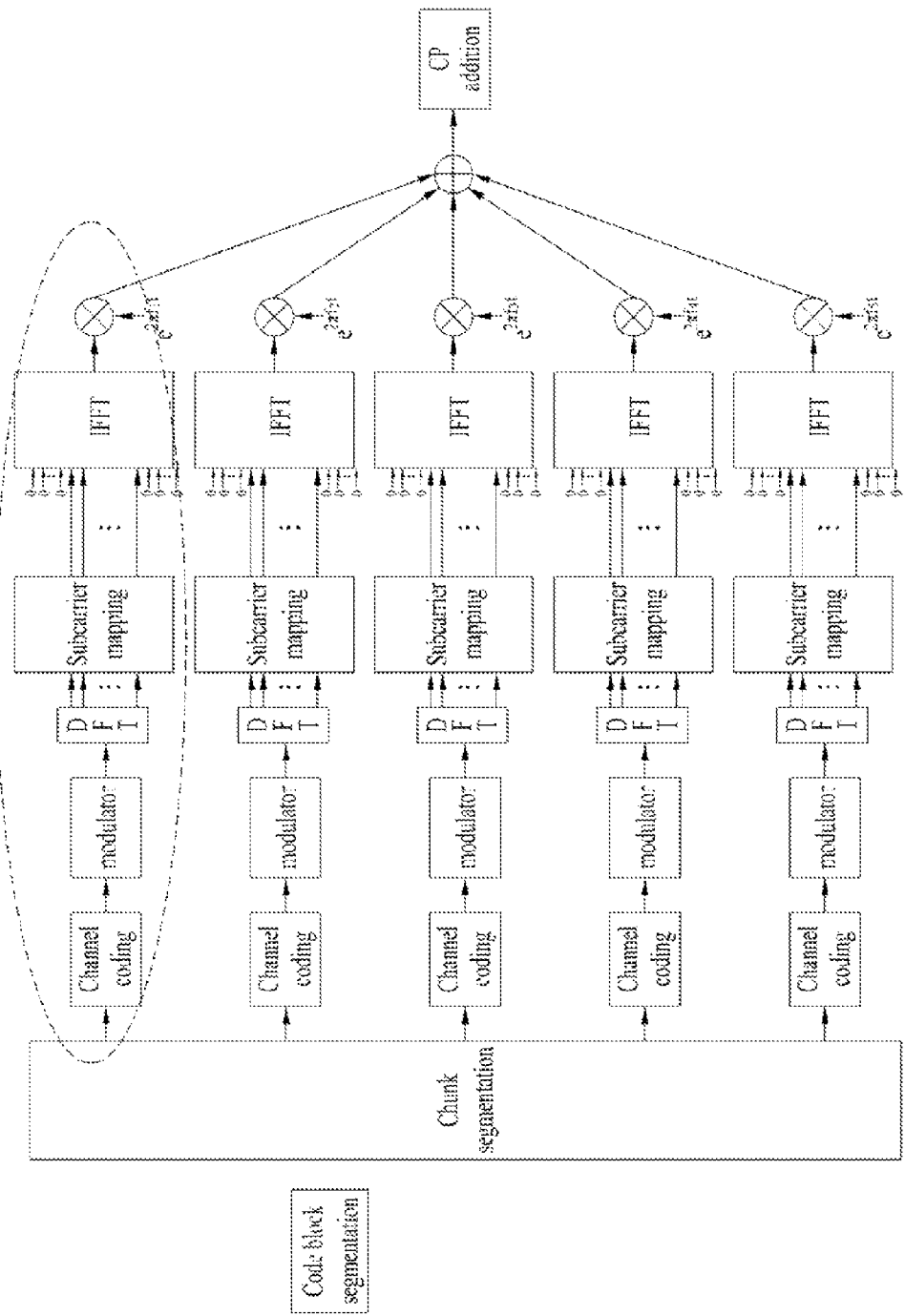

FIG. 12 illustrates a chunk-specific DFT-s-OFDMA scheme in which DFT, frequency mapping, and IFFT are performed on a chunk basis. Chunk-specific DFT-s-OFDMA may also be referred to as Nx SC-FDMA. A code block resulting from code block segmentation is divided into chunks and the chunks are channel-encoded and modulated individually. The modulated signals are subjected to DFT, frequency mapping, and IFFT and the IFFT signals are summed and then added with a CP in the same manner as described with reference to FIG. 5. The Nx SC-FDMA scheme illustrated in FIG. 12 is applicable to both a case of contiguous multiple carriers and a case of non-contiguous multiple carriers.

MIMO System

MIMO does not depend on a single antenna path to receive a whole message. Rather, it completes the message by combining data fragments received through a plurality of antennas. Because MIMO can increase data rate within a certain area or extend system coverage at a given data rate, it is considered as a promising future-generation mobile communication technology that may find its use in a wide range including mobile terminals, relays, etc. MIMO can overcome a limited transmission capacity caused by increased data communication.

MIMO schemes can be categorized into spatial multiplexing and spatial diversity depending on whether the same data is transmitted or not. In spatial multiplexing, different data is transmitted simultaneously through a plurality of Tx antennas. As a transmitter transmits different data through different Tx antennas and a receiver distinguishes the transmission data by appropriate interference cancellation and signal processing, a transmission rate can be increased by as much as the number of transmission antennas. Spatial diversity is a scheme that achieves transmit diversity by transmitting the same data through a plurality of Tx antennas. Space time channel coding is an example of spatial diversity. Since the same data is transmitted through a plurality of Tx antennas, spatial diversity can maximize a transmission diversity gain (a performance gain). However, spatial diversity does not increase transmission rate. Rather, it increases transmission reliability using a diversity gain. These two schemes may offer their benefits when they are appropriately used in combination. In addition, MIMO schemes may be categorized into open-loop MIMO (or channel-independent MIMO) and closed-loop MIMO (or channel-dependent MIMO) depending on whether a receiver feeds back channel information to a transmitter.

Figure 13:
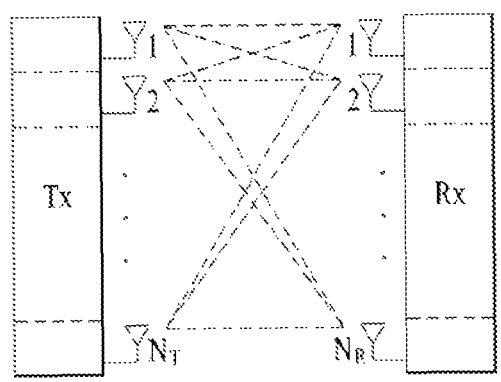
FIG. 13 illustrates a Multiple Input Multiple Output (MIMO) transmission scheme.
Figure 13:
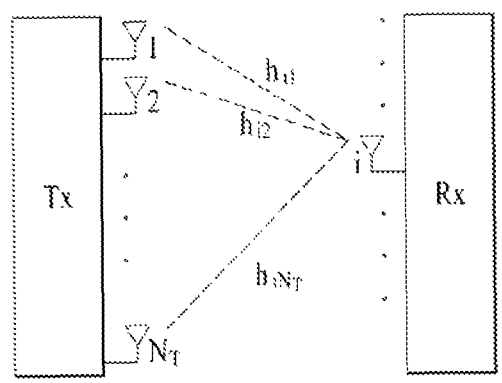

FIG. 13 illustrates the configuration of a typical MIMO communication system. Referring to FIG. 13(*a*), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \qquad \text{Equation 1}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. As illustrated in FIG. 13(*a*), it is assumed that $N_T$ Tx antennas and $N_R$ Rx antennas exist. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{Equation 2}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P s_1, P s_2, \ldots, P s_{N_T}]^T \qquad \text{Equation 3}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{Equation 4}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5. Herein, $w_{ij}$ denotes a weight between an $i^{th}$ antenna and a $j^{th}$ piece of information. W is called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{Equation 5}$$

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \qquad \text{Equation 6}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. The vector representation of channels may be carried out in the following manner. FIG. 13(*b*) illustrates channels from $N_T$ Tx antennas to an $i^{th}$ Rx antenna.

As illustrated in FIG. 13(*b*), channels from the $N_T$ Tx antennas to an $i^{th}$ Rx antenna may be expressed as $$h_i^T = [h_{i1}, h_{i2}, \ldots, h_{iN_T}] \qquad \text{Equation 7}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R1} & h_{N_R2} & \cdots & h_{N_RN_T} \end{bmatrix} \quad \text{Equation 8}$$

Actual channels experience the above channel matrix H and then are added with Additive White Gaussian Noise (AWGN). The AWGN $n_1, n_2, \ldots, n_{N_r}$ added to the $N_R$ Rx antennas is given as the following vector.

$$n = [n_1, n_2, \ldots, n_{N_R}]^T \quad \text{Equation 9}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{Equation 10}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \quad \text{Equation 11}$$

In relation to the afore-described MIMO transmission schemes, a codebook-based precoding scheme will be described in great detail.

In the codebook-based precoding scheme, a transmitter and a receiver share a codebook including a predetermined number of precoding matrices according to a transmission rank, the number of antennas, etc. That is, if feedback information is finite, the precoding-based codebook scheme may be used. The receiver may measure channel states from received signals and feedback information about a finite number of preferred precoding matrices (i.e. the indexes of the precoding matrices) based on the afore-described codebook information. For example, the receiver may measure a received signal by Maximum Likelihood (ML) or Minimum Means Square Error (MMSE) and may select an optimum precoding matrix. The receiver may transmit precoding matrix information for each codeword to the transmitter, which should not be construed as limiting the present invention.

Upon receipt of feedback information from the receiver, the transmitter may select a specific precoding matrix from a codebook based on the received information. After selecting the precoding matrix, the transmitter may precode a transmission signal by multiplying as many layer signals as a transmission rank by the selected precoding matrix and may transmit the precoded transmission signal through a plurality of antennas. The number of rows is equal to the number of antennas and the number of columns is equal to the rank in the precoding matrix. For example, if the number of Tx antennas is 4 and the number of layers is 2, the precoding matrix may be a 4×2 matrix. The following Equation 12 describes mapping of information mapped to layers to antennas by a precoding matrix.

$$\begin{bmatrix} y_1 \\ y_2 \\ y_3 \\ y_4 \end{bmatrix} = \begin{bmatrix} p_{11} & p_{21} \\ p_{12} & p_{22} \\ p_{13} & p_{23} \\ p_{14} & p_{24} \end{bmatrix} \cdot \begin{bmatrix} x_1 \\ x_2 \end{bmatrix} \quad \text{Equation 12}$$

Referring to Equation 12, $x_1$ and $x_2$ denote information mapped to layers and each element of the 4×2 matrix, $p_{ij}$ denotes a weight used for precoding. $y_1, y_2, y_3$ and $y_4$ denote information mapped to the antennas, which may be transmitted through the respective antennas in OFDM.

Upon receipt of the precoded signal from the transmitter, the receiver may recover the received signal by reversely performing the precoding of the transmitter. In general, a precoding matrix satisfies a unitary matrix U condition such as $U*U^H=I$. The reverse operation of precoding may be performed by multiplying a received signal by the Hermitian matrix $P^H$ of a precoding matrix used in precoding of the transmitter.

As described before, the 3GPP LTE-A (LTE Release-10) system may adopt uplink multi-antenna transmission in order to increase uplink transmission throughput. As an uplink multi-antenna transmission scheme, a multi-transmission stream or multi-transmission layer transmission scheme may be used for a single UE for the purpose of spatial multiplexing. This is called SU-MIMO. In uplink SU-MIMO, link adaptation may be applied to each individual transmission stream or transmission stream group. Different Modulation and Coding Schemes (MCSs) may be used for link adaptation. For this purpose, Multiple CodeWord (MCW)-based transmission may be performed on uplink.

In an MCW MIMO scheme, for example, up to two CodeWords (CWs) may be transmitted simultaneously. For the MIMO transmission, information about an MCS used in a transmitter, a New Data Indicator (NDI) indicating whether transmitted data is new data or retransmission data, and a Redundancy Version (RV) indicating a transmitted sub-packet in case of retransmission is needed. An MCS, NDI, and RV may be defined for each Transport Block (TB).

A plurality of TBs may be mapped to a plurality of CWs according to a transport block-to-codeword mapping rule. For example, let two RBs be denoted by TB1 and TB2 and let two CWs be denoted by CW0 and CW1. When the two TBs TB1 and TB2 are enabled, the first and second TBs TB1 and TB2 may be mapped respectively to the first and second CWs CW0 and CW1. Or the first TB TB1 may be mapped to the second CW CW1 and the second TB TB2 may be mapped to the first CW CW0 according to the value of a transport block-to-codeword swap flag. If one of the two TBs is enabled and the other TB is disabled, the enabled TB may be mapped to the first CW CW0. That is, a one-to-one mapping relationship is placed between TBs and CWs. TB disabling covers the size of a TB being 0. When the size of a TB is 0, the TB is not mapped to a CW.

Figure 14:
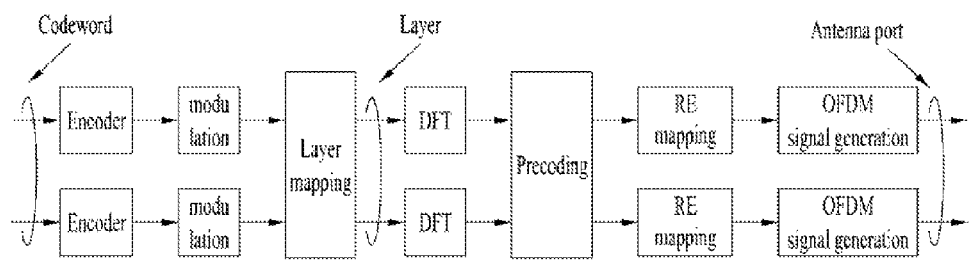
FIG. 14 is a block diagram of a DFT-s-OFDMA uplink transmission structure.

FIG. 14 is a block diagram of an uplink MCW SU-MIMO transmission structure.

After encoding in encoders, one or more CWs may be scrambled with a UE-specific scrambling signal. The scrambled CWs are modulated to complex symbols in Binary Phase Shift Keying (BPSK), Quadrature Phase Shift Keying (QPSK), 16-ary Quadrature Amplitude Modulation (16QAM), or 64-ary QAM (64QAM) according to the type of a transmission signal and/or a channel state. The modulated complex symbols are mapped to one or more layers. In case of signal transmission through a single antenna, one CW is mapped to one layer and then transmitted. In contrast, in case of signal transmission through multiple antennas, a codeword-to-layer mapping relationship may be established according to a transmission scheme as illustrated in [Table 1] and [Table 2].

TABLE 1

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |

TABLE 2

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$<br>If $M_{symb}^{(0)} \bmod 4 \neq 0$ two null symbols shall be appended to $d^{(0)}(M_{symb}^{(0)} - 1)$ |

[Table 1] illustrates an example of transmitting a signal in spatial multiplexing and [Table 2] illustrates an example of transmitting a signal in transmit diversity. In [Table 1] and [Table 2], $x^{(a)}(i)$ denotes an $i^{th}$ symbol of a layer with index a and $d^{(a)}(i)$ denotes an $i^{th}$ symbol of a CW with index a. A mapping relationship between the number of CWs and the number of layers used for transmission may be known from "Number of layers" and "Number of codewords" in [Table 1] and [Table 2]. "Codeword-to-Layer mapping" indicates how the symbols of each CW are mapped to a layer.

As noted from [Table 1] and [Table 2], although one CW may be mapped to one layer on a symbol basis prior to transmission, one CW may be distributed to up to 4 layers as in the second case of [Table 2]. When one CW is distributed to a plurality of layers in this manner, the symbols of each CW are mapped sequentially to layers. On the other hand, in case of single CW transmission, a single encoder and a single modulation block exist.

The layer-mapped signals may be subject to DFT. In addition, the layer-mapped signals may be multiplied by a specific precoding matrix selected according to a channel state and then assigned to Tx antennas. To avoid an increase in PAPR (or CM) of an uplink transmission from a UE, precoding may be performed in the frequency domain after DFT in the DFT-s-OFDMA structure.

The antenna-specific transmission signals may be mapped to time-frequency REs for transmission and transmitted through the antennas after being processed in OFDM signal generators.

Figure 15A:
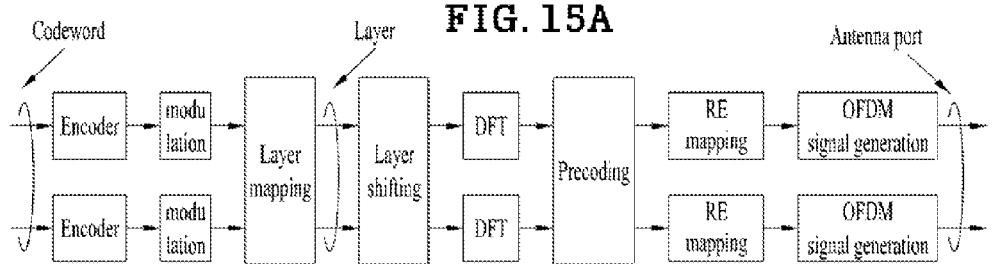
FIGS. 15A and 15B are block diagrams of structures using layer shifting for DFT-s-OFDMA uplink transmission.
Figure 15B:
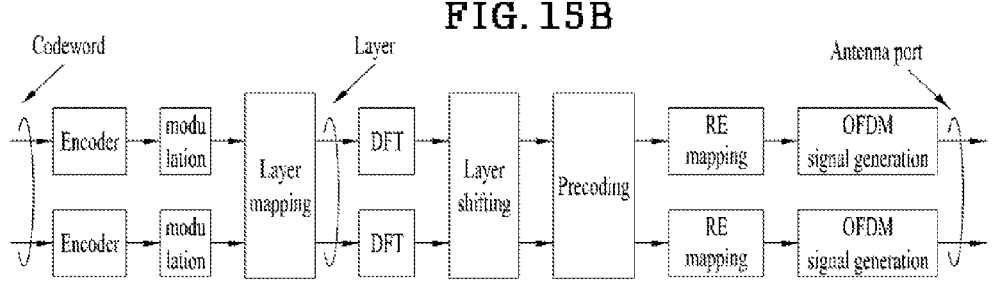

FIG. 15A and FIG. 15B are exemplary block diagrams of layer shifting in an uplink MCW SU MIMO transmission structure.

Layer shifting (or layer permutation) refers to permuting the order of mapping transmission streams or transmission layers on a time resource area unit (e.g. on an OFDM symbol basis or on a slot basis). Layer shifting may be performed before DFT (FIG. 15A) or after DFT (FIG. 15B). Or layer shifting may take place after OFDM signal generation. However, layer shifting is not always needed and thus may be excluded from uplink transmission.

Precoding will be described in greater detail in relation to FIGS. 14, 15A and 15B. Precoding is a process of combining a transmission signal with a weight vector or a weight matrix to transmit a signal on spatial channels. The precoding blocks of FIGS. 14, 15A and 15B may implement transmit diversity, long-term beamforming, precoded signal multiplexing, etc. To effectively support precoded signal multiplexing, precoding weights may be constructed into a codebook. [Table 3] to [Table 7] illustrate exemplary codebooks used to prevent an increase in CM for uplink transmission.

[Table 3] illustrates an exemplary codebook available for uplink spatial multiplexing transmission through 2 Tx antennas. Given two Tx antennas, one of 6 precoding matrices is available for rank-1 transmission and one precoding matrix is available for rank-2 transmission.

TABLE 3

| Codebook Index | Number of layers ν | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | |

TABLE 3-continued

| Codebook Index | Number of layers v : 1 | 2 |
|---|---|---|
| 2 | $\frac{1}{\sqrt{2}}\begin{bmatrix} 1 \\ j \end{bmatrix}$ | |
| 3 | $\frac{1}{\sqrt{2}}\begin{bmatrix} 1 \\ -j \end{bmatrix}$ | — |
| 4 | $\frac{1}{\sqrt{2}}\begin{bmatrix} 1 \\ 0 \end{bmatrix}$ | |
| 5 | $\frac{1}{\sqrt{2}}\begin{bmatrix} 0 \\ 1 \end{bmatrix}$ | |

[Table 4] illustrates precoding matrices included in a 6-bit precoding codebook available for transmission of one layer (i.e. rank-1 transmission) in uplink spatial multiplexing transmission through 4 Tx antennas. For 4-Tx rank-1 transmission, one of a total of 24 precoding matrices may be used.

TABLE 4

| | Codebook |
|---|---|
| Index 0 to 7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| Index 8 to 15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| Index 16 to 23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

[Table 5] illustrates precoding matrices included in a precoding codebook available for transmission of 2 layers (i.e. rank-2 transmission) in an uplink spatial multiplexing transmission scheme using 4 Tx antennas. For 4-Tx rank-2 transmission, one of a total of 16 precoding matrices may be used.

TABLE 5

| | Codebook |
|---|---|
| Index 0 to 3 | $\frac{1}{2}\begin{bmatrix}1&0\\1&0\\0&1\\0&-j\end{bmatrix}$ $\frac{1}{2}\begin{bmatrix}1&0\\1&0\\0&1\\0&j\end{bmatrix}$ $\frac{1}{2}\begin{bmatrix}1&0\\-j&0\\0&1\\0&1\end{bmatrix}$ $\frac{1}{2}\begin{bmatrix}1&0\\-j&0\\0&1\\0&-1\end{bmatrix}$ |

TABLE 5-continued

| | Codebook |
|---|---|
| Index 4 to 7 | $\frac{1}{2}\begin{bmatrix}1&0\\-1&0\\0&1\\0&-j\end{bmatrix}$ $\frac{1}{2}\begin{bmatrix}1&0\\-1&0\\0&1\\0&j\end{bmatrix}$ $\frac{1}{2}\begin{bmatrix}1&0\\j&0\\0&1\\0&1\end{bmatrix}$ $\frac{1}{2}\begin{bmatrix}1&0\\j&0\\0&1\\0&-1\end{bmatrix}$ |
| Index 8 to 11 | $\frac{1}{2}\begin{bmatrix}1&0\\0&1\\1&0\\0&1\end{bmatrix}$ $\frac{1}{2}\begin{bmatrix}1&0\\0&1\\1&0\\0&-1\end{bmatrix}$ $\frac{1}{2}\begin{bmatrix}1&0\\0&1\\-1&0\\0&1\end{bmatrix}$ $\frac{1}{2}\begin{bmatrix}1&0\\0&1\\-1&0\\0&-1\end{bmatrix}$ |
| Index 12 to 15 | $\frac{1}{2}\begin{bmatrix}1&0\\0&1\\0&1\\1&0\end{bmatrix}$ $\frac{1}{2}\begin{bmatrix}1&0\\0&1\\0&-1\\1&0\end{bmatrix}$ $\frac{1}{2}\begin{bmatrix}1&0\\0&1\\0&1\\-1&0\end{bmatrix}$ $\frac{1}{2}\begin{bmatrix}1&0\\0&1\\0&-1\\-1&0\end{bmatrix}$ |

[Table 6] illustrates precoding matrices included in a precoding codebook available for transmission of 3 layers (i.e. rank-3 transmission) in the uplink spatial multiplexing transmission scheme using 4 Tx antennas. For 4-Tx rank-3 transmission, one of a total of 12 precoding matrices may be used.

TABLE 6

| | Codebook |
|---|---|
| Index 0 to 3 | $\frac{1}{2}\begin{bmatrix}1&0&0\\1&0&0\\0&1&0\\0&0&1\end{bmatrix}$ $\frac{1}{2}\begin{bmatrix}1&0&0\\-1&0&0\\0&1&0\\0&0&1\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ |
| Index 4 to 7 | $\frac{1}{2}\begin{bmatrix}1&0&0\\0&1&0\\0&0&1\\1&0&0\end{bmatrix}$ $\frac{1}{2}\begin{bmatrix}1&0&0\\0&1&0\\0&0&1\\-1&0&0\end{bmatrix}$ $\frac{1}{2}\begin{bmatrix}0&1&0\\1&0&0\\1&0&0\\0&0&1\end{bmatrix}$ $\frac{1}{2}\begin{bmatrix}0&1&0\\1&0&0\\-1&0&0\\0&0&1\end{bmatrix}$ |

TABLE 6-continued

| | Codebook | | | |
|---|---|---|---|---|
| Index 8 to 11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

[Table 7] illustrates precoding matrices included in a precoding codebook available for transmission of 4 layers (i.e. rank-4 transmission) in the uplink spatial multiplexing transmission scheme using 4 Tx antennas. For 4-Tx rank-4 transmission, only one precoding matrix may be used.

TABLE 7

| | Codebook |
|---|---|
| Index 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

For reliable uplink multi-antenna transmission, the following operations may be considered. First of all, a UE may transmit an RS and an eNB may acquire spatial channel information about an uplink directed from the UE to the eNB from the RS. The eNB may select a rank suitable for uplink transmission, acquire a precoding weight, and calculate Channel Quality Information (CQI) based on the acquired spatial channel information. The eNB may signal control information for uplink signal transmission to the UE. The control information may include uplink transmission resource assignment information, MIMO information (a rank, a precoding weight, etc.), an MCS level, HARQ information (an RV, an NDI, etc.), and uplink DM-RS sequence information. The UE may transmit an uplink signal using the control information received from the eNB.

The present invention proposes a specific method for efficiently configuring MCS information, HARQ information, and MIMO information among control information that an eNB signals to a UE for uplink multi-antenna transmission.

In an MCW multi-antenna system, codeword-to-layer mapping relationships may be defined as illustrated in [Table] 1. As noted from [Table] 1, when a single CW is used, a transmission rank may be 1 or 2. Especially, rank-2 transmission of one CW may be limited to retransmission. When two CWs are used, the transmission rank may be 2, 3 or 4.

When up to two CWs are used for transmission, control information may include two MCS levels, two RVs, and two NDIs. This control information for MCW uplink transmission may be transmitted to a UE in a DCI format on a PDCCH.

In the control information, for example, an MCS field may be 5 bits. [Table 8] and [Table 9] illustrate exemplary configurations of an MCS field for downlink data transmission (a PDSCH) and uplink data transmission (a PUSCH). As illustrated in [Table 8], an MCS field may be configured for a PDSCH to represent 29 states that indicate MCSs by combining modulation orders and Transport Block Sizes (TBSs) and 3 states indicating MCSs by modulation orders only. In addition, As illustrated in [Table 9], an MCS field may be configured for a PUSCH to represent 29 states indicated by combining modulation orders, TBS indexes, and RV value '0' and 3 states indicated by RVs only.

TABLE 8

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 23 |
| 28 | 6 | 26 |
| 29 | 2 | reserved |
| 30 | 4 | |
| 31 | 6 | |

TABLE 9

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 23 | 0 |
| 28 | 6 | 26 | 0 |
| 29 | reserved | | 1 |

TABLE 9-continued

| MCS Index $I_{MCS}$ | Modulation Order $Q_m$ | TBS Index $I_{TBS}$ | Redundancy Version $rv_{idx}$ |
|---|---|---|---|
| 30 | | | 2 |
| 31 | | | 3 |

[Table 8] is an MCS table for downlink data transmission. Control information for downlink transmission may include MCS bits, an RV bit, and an NDI bit. A modulation order, a coding rate, and an RV may be determined for new transmission and retransmission by combining these information.

In an MCS MIMO system that transmits a plurality of CWs, if a CW is disabled (e.g. when a buffer of a transmitter transmits almost all data as intended and a CW is unnecessary, or only one CW remains to be retransmitted during HARQ transmission), disabling of the CW may be indicated by the following signaling.

If $I_{MCS}=0$ and $rv_{idx}=1$ in DCI formats 2 and 2A for downlink PDSCH transmission, this may mean that a TB is disabled. Otherwise, it may mean that a TB is enabled. That is, whether a CW is enabled or disabled may be indicated by using an MCS field and an RV field in combination.

[Table 9] illustrates an MCS table for uplink single CW transmission. Control information for uplink transmission includes MCS bits and an NDI bit, and RV information is included in the MCS table (i.e. the RV information and MCS information are jointly encoded). Compared to the control information for downlink data transmission, the control information for uplink data transmission does not include an RV field.

In regards to configuring control information for uplink MCW transmission, no method for indicating a disabled CW has been specified. It is difficult to apply a method for indicating a disabled CW on a downlink as defined in the legacy LTE system (e.g. 3GPP LTE release-8) (i.e. if $I_{MCS}=0$ and $rv_{idx}=1$, it indicates that a corresponding CW is disabled) to control information for uplink MCW transmission. Therefore, the present invention proposes methods for configuring new control information that indicates a disabled CW in uplink MCW MIMO transmission.

Methods for Configuring Control Information Indicating Disabled Uplink TB

Method 1

In Method 1, whether a CW is disabled in uplink MCW transmission is indicated by redefining one or more states defined in a conventional MCS table for other usages.

In Embodiment 1-1, it is assumed that MCS fields are defined to support two CWs and a part of an MCS field for a second TB may be redefined for other usage.

In Embodiment 1-2, among 32 states represented by an MCS field, if some MCS states are represented by combining modulation orders, TBSs, and RV value '0' (e.g. MCS index #0 to #28 in Table 9), an MCS state indicating the lowest modulation order and the smallest TBS may be redefined to represent a TB disabled state. For example, MCS index #0 indicating the lowest modulation order and the smallest TBS may be redefined to represent a TB disabled state.

In Embodiment 1-3, among 32 states represented by an MCS field, if some MCS states are represented by combining modulation orders, TBSs, and RV value '0' (e.g. MCS index #0 to #28 in [Table 9]), an MCS state indicating the highest modulation order and the largest TBS may be redefined to represent a TB disabled state. For example, MCS index #28 indicating the highest modulation order and the largest TBS may be redefined to represent a TB disabled state.

In Embodiment 1-4, when two MCS fields are defined, a part of states indicating only RVs (e.g. MCS index #29 and #30 in [Table 9]) may be redefined to represent a TB disabled state among states represented by a second MCS field for a second TB. For example, MCS index #31 indicates that an MCS and a TBS are reserved and an RV is '3' in [Table 9]. Then MCS index #31 in the MCS field for the second TB may be used to indicate the TB disabled state. However, MCS index #31 is purely exemplary and thus MCS indexes #29 and #30 may be used for the same usage.

In Embodiment 1-5, a part of MCS states indicating only RVs may be redefined to represent TB disabled among MCS states represented by an MCS table. Compared to Embodiment 1-4, the TB disabled state is redefined for each of a plurality of MCS tables. For example, MCS index #31 indicates that an RV is '3' and an MCS and a TBS are reserved in [Table 9]. Then MCS index #31 for the MCS field for the second TB may be used to indicate TB disabled. However, MCS index #31 is purely exemplary and thus MCS indexes #29 and #30 may be used for the same usage.

In Embodiment 1-6, a part of states indicating modulation orders and TBSs that have the same spectral efficiency may be used to indicate TB disabled among fields defined in an MCS table.

Method 2

In Method 2, a new MCS table is defined with a part of a conventional 5-bit MCS table. Accordingly, the new MCS table may have a smaller size than the conventional MCS table, for example, 2 or 3 bits.

States having equidistant TBS indexes in the conventional MCS table may form a new MCS table. The new MCS table may include information about CW disabling. That is, a specific state may be defined as the TB disabled state in the new 2-bit or 3-bit MCS table.

Method 3

Method 3 interprets a conventional MCS field and NDI field in a different manner. That is, an MCS field including a modulation order, a TBS, and RV information and an NDI field are considered together. Thus, a specific combination may be interpreted to represent the TB disabled state.

In the MCS field for PUSCH transmission, MCS indexes #29 to #31 are used to indicate new RVs. Herein, MCS indexes #29 to #31 indicating new RVs are used only for retransmission and a modulation order for retransmission is the same as for initial transmission. An NDI bit is not toggled at retransmission (e.g. If the NDI is 0 at initial transmission, the NDI is still 0 at retransmission. If the NDI is 1 at initial transmission, the NDI is still 1 at retransmission). That is, if MCSs #29 to #31 are indicated for retransmission, the NDI bit is basically not toggled. In other words, a combination of indication of MCSs #29 to #31 and toggling of an NDI bit has not been defined in the conventional control information configuration. The present invention proposes a method for indicting a TB disabled state by combining an MCS field with an NDI bit.

In transmission of two or more TBs, a combination of an MCS index indicating an RV only and an NDI bit value may be considered as a method for indicating a disabled TB.

Specifically, if an MCS field indicates only an RV (i.e. indicates one of MCS indexes #29 to #31) and an NDI bit has been toggled from a previous transmission, this may be newly interpreted as indicating TB disabled.

When the NDI bit is toggled to indicate TB disabled, an HARQ buffer may be flushed.

If a buffer for a disabled TB is flushed, the NDI bit is toggled at the next transmission, and the MCS field indicates a modulation order, a TBS, and RV '0' like MCS indexes #0 to #28, a new transmission is attempted.

Meanwhile, if an HARQ process in which a TB is disabled occurs during ACK/NACK signal transmission on two PHICHs, ACK/NACK information for one TB may be represented using one PHICH resource. For instance, in case of layer shifting, it can be said that the error probabilities of two CWs (or TBs) are equal. Therefore, one PHICH resource is sufficient to represent ACK/NACK information.

In the case where ACK/NACK signals are transmitted on a PHICH representing a plurality of states to support MCS, when a TB is disabled, an ACK/NACK may be represented for a transmitted TB using a PHICH having a state indicating the number of transmitted TBs.

As described before, if reception success or failure of two TBs can be indicated by one HARQ ACK/NACK, a single NDI field may indicate that the two TBs are new data or retransmission data, instead of two NDI fields. Accordingly, one NDI field may be defined for each TB or all TBs.

The following bit fields may be configured as control information for supporting MCW MIMO transmission by considering the above description comprehensively.

In Case 1, control information may be configured so as to have two MCS fields (of the same bit size) and two NDI fields.

For a first TB,
MCS: 5 bits
NDI: 1 bit.
For a second TB,
MCS: 5 bits
NDI: 1 bit.

If control information is configured as in Case 1, implementation of Embodiment 1-2 or 1-3 in Method 1 will be described. For example, if an MCS field for one TB indicates RV '0', the lowest modulation order, and the smallest TBS (i.e. MCS index #0) or if the MCS field indicates RV '0', the highest modulation order, and the largest TBS (i.e. MCS index #28), this may mean that the TB is disabled. In other words, if $I_{MCS}=0$ or $I_{MCS}=28$ in an MCS table defined for a TB in a DCI format for uplink SU-MIMO transmission, the TB is disabled. Otherwise, it may indicate that the TB is enabled.

In Case 2, control information may be configured so as to have two MCS fields (of the same bit size) and one NDI field.

For a first TB,
MCS: 5 bits
NDI: 1 bit.
For a second TB,
MCS: 5 bits

In Case 3, control information may be configured in such a manner that one of two MCS fields has a bit size equal to a part of the bit size of the other MCS field (see Method 2) and two NDI fields are defined.

For a first TB,
MCS: 5 bits
NDI: 1 bit.
For a second TB,
MCS: N (N<5) bits
NDI: 1 bit.

In Case 4, control information may be configured in such a manner that one of two MCS fields has a bit size equal to a part of the bit size of the other MCS field (see Method 2) and one NDI field is defined.

For a first TB,
MCS: 5 bits
NDI: 1 bit.
For a second TB,
MCS: N (N<5) bits

As described before, various MCS and NDI combinations may be produced for uplink MCW MIMO transmission. In addition, an enabled or disabled CW can be indicated by interpreting an MCS field in the above-described manners.

Methods for Indicating Uplink Precoding Information

As described before, whether a TB is enabled or disabled in uplink MIMO transmission may be signaled by control information that schedules uplink MIMO transmission (a DCI format). The present invention proposes a method for configuring control information that efficiently indicates precoding information for MIMO transmission, using the number of enabled TBs indicated through interpretation of the control information as information.

As described before in relation to a transport block-to-codeword mapping relationship, when two TBs are enabled, one of the TBs may be mapped to a first CW CW0 and the other TB may be mapped to a second CW CW1 (swapping of transport block-to-codeword mapping is included). If only one of the two TBs is enabled, the enabled TB is mapped to the first CW, CW0.

First of all, the size of necessary precoding information according to an uplink transmission rank (i.e. the number of antenna ports used for uplink transmission) will be described again. As described before with reference to [Table 3], when a UE has 2 Tx antennas, one of 6 precoding matrices may be used for rank-1 transmission and one precoding matrix may be used for rank-2 transmission. Therefore, for 2 Tx antennas, sizes of necessary precoding information may be summarized in [Table 10] below.

TABLE 10

| | Precoding information size |
|---|---|
| Rank-1 | 6 |
| Rank-2 | 1 |

As described before with reference to [Table 4] to [Table 7], when a UE has 4 Tx antennas, one of 24 precoding matrices may be used for rank-1 transmission, one of 16 precoding matrices may be used for rank-2 transmission, one of 12 precoding matrices may be used for rank-3 transmission, and one precoding matrix may be used for rank-4 transmission. Hence, sizes of precoding information needed for 4 Tx antennas may be summarized in [Table 11] below.

TABLE 11

| | Precoding Information size |
|---|---|
| Rank-1 | 24 |
| Rank-2 | 16 |
| Rank-3 | 12 |
| Rank-4 | 1 |

Uplink transmission ranks that are available according to numbers of enabled CWs may be summarized, taking into account a codeword-to-layer mapping relationship in [Table 12] and [Table 13]. [Table 12] lists ranks according to numbers of enabled CWs, for 2 Tx antennas and [Table 13] lists ranks according to numbers of enabled CWs, for 4 Tx antennas.

TABLE 12

| One CW | Two CW |
|---|---|
| Rank-1 | Rank-2 |

TABLE 13

| One CW | Two CW |
|---|---|
| Rank-1 | Rank-2 |
| Rank-2 | Rank-3 |
|  | Rank4 |

According to [Table 10] to [Table 13], the size of necessary precoding information (i.e. the number of states represented by a precoding information field) may be defined according to the number of enabled CWs. For example, [Table 14] and [Table 15] may be built by substituting the sizes of precoding information based on ranks listed in [Table 10] and [Table 11] into [Table 12] and [Table 13]. [Table 14] is for 2 Tx antennas and [Table 14] is for 4 Tx antennas. As described before, whether only one CW or both CWs are enabled in [Table 14] and [Table 15] may be indicated by interpreting an MCS field and/or other information in uplink MIMO control information (a DCI format) as proposed in Method 1, Method 2 and Method 3.

TABLE 14

| One CW enabled | Two CWs enabled |
|---|---|
| Rank-1 | Rank-2 |
| 6-state precoding information | 1-state precoding information |

TABLE 15

| One CW | Two CW |
|---|---|
| Rank-1 | Rank-2 |
| 24-state precoding information | 16-state precoding information |
| Rank-2 | Rank-3 |
| 16-state precoding information | 12-state precoding information |
|  | Rank4 |
|  | 1-state precoding information |

As illustrated in [Table 14], all precoding information for 2 Tx antennas may be represented in 3 bits (a total of 8 states can be represented). As illustrated in [Table 15], all precoding information for 4 Tx antennas may be represented in 6 bits (a total of 64 states can be represented).

A precoding information field may be interpreted differently according to the number of enabled CWs. The number of enabled CWs may be known depending on whether a TB is enabled or not in Method 1, Method 2, and Method 3. For example, when two TBs are enabled, it may be determined that two CWs are enabled. On the other hand, if one of the two TBs is disabled, it may be determined that only the first CW, CW0 is enabled. Since the number of enabled CWs can be determined in this manner, the precoding information field may indicate rank information and a precoding matrix index differently according to the number of enabled CWs.

More specifically, for 2 Tx antennas for uplink transmission (in the case of [Table 14]), when one CW is enabled, each of 6 states of precoding information indicates rank-1 transmission and a precoding matrix to be used for uplink transmission. For example, if the bit value of precoding information is 0, this indicates a precoding matrix with codebook index 0 and if the bit value of precoding information is 1, this indicates a precoding matrix with codebook index 1 in the case of 1 layer in [Table 3]. Meanwhile, in the case where the bit value of the precoding information is 0, if two CWs are enabled, this indicates rank-2 transmission and a precoding matrix with codebook index 0 in the case of 2 layers in [Table 3]. In other words, even though the precoding information has the same bit value, the precoding information may represent different rank information and precoding matrix information according to the number of enabled CWs.

Similarly, for 3 Tx antennas for uplink transmission, precoding information having the same bit value may represent different rank information and precoding matrix information according to the number of enabled CWs. For example, it is assumed that precoding information has a bit value of 4 in [Table 15]. If one CW is enabled, the precoding information may represent rank-1 transmission and a precoding matrix with codebook index 4 in [Table 5].

Since a precoding information field indicating every possible precoding matrix for uplink SU-MIMO information can be configured in a minimum number of bits, the present invention can efficiently provide uplink scheduling control information by reducing signaling overhead.

Meanwhile, if the size of a precoding information field is defined as described before, remaining states that are represented by precoding information may be reserved for other control information.

A reserved bit of the precoding information field may be used to represent a state where single antenna transmission or 1-CW transmission is allowed, when MIMO transmission is set.

For instance, when MIMO transmission is set but control information for MIMO transmission is not sufficiently secured, a simplest transmission scheme may be supported to be used until MIMO transmission is stabilized. For example, since single-antenna transmission enables data transmission with minimum channel information, a reserved state of precoding information may be defined as a state that allows single-antenna transmission. Accordingly, precoding information may be configured as illustrated in [Table 16] and [Table 17].

TABLE 16

| One CW enabled | Two CWs enabled |
|---|---|
| Rank-1 | Rank-2 |
| 6-state precoding information | 1-state precoding information |
| Single antenna transmission |  |
| (or any transmission scheme using one CW) |  |

TABLE 17

| One CW | Two CWs |
|---|---|
| Rank-1 | Rank-2 |
| 24-state precoding information | 16-state precoding information |
| Rank-2 | Rank-3 |
| 16-state precoding information | 12-state precoding information |
| Single antenna transmission | Rank-4 |
| (or any transmission scheme using one CW) | 1-state precoding information |

Bits indicating precoding information may be efficiently used by reducing the number of states represented by the precoding information. For example, the bits of precoding information may be decreased from 6 bits to 5 bits.

For this purpose, a precoding weight for rank-2 transmission of one CW may be expressed as a subset of a precoding weight for rank-2 transmission of two CWs. For example, when a rank-2 precoding weight includes 16 elements, a part of the elements may be used as a precoding weight for rank-2 transmission of one CW.

For example, when only one CW is enabled, precoding information may be configured only with a rank-1 codebook and a rank-2 codebook. The rank-2 codebook represents N (N≤12) states. [Table 18] to [Table 21] illustrate cases where a rank-2 codebook for transmission of one CW has 12, 8, 6 and 4 states, respectively, for 4 Tx antennas.

TABLE 18

| One CW | Two CW |
|---|---|
| Rank-1 | Rank-2 |
| 24-state precoding information | 16-state precoding information |
| Rank-2 | Rank-3 |
| 12-state precoding information | 12-state precoding information |
|  | Rank4 |
|  | 1-state precoding information |
|  | Reserved (3-states) |

TABLE 19

| One CW | Two CW |
|---|---|
| Rank-1 | Rank-2 |
| 24-state precoding information | 16-state precoding information |
| Rank-2 | Rank-3 |
| 8-state precoding information | 12-state precoding information |
|  | Rank4 |
|  | 1-state precoding information |
|  | Reserved (3-states) |

TABLE 20

| One CW | Two CW |
|---|---|
| Rank-1 | Rank-2 |
| 24-state precoding information | 16-state precoding information |
| Rank-2 | Rank-3 |
| 6-state precoding information | 12-state precoding information |
| Reserved (2-states) | Rank4 |
|  | 1-state precoding information |
|  | Reserved (3-states) |

TABLE 21

| One CW | Two CW |
|---|---|
| Rank-1 | Rank-2 |
| 24-state precoding information | 16-state precoding information |
| Rank-2 | Rank-3 |
| 4-state precoding information | 12-state precoding information |
| Reserved (4-states) | Rank4 |
|  | 1-state precoding information |
|  | Reserved (3-states) |

In another example, when only one CW is enabled, precoding information is configured so as to represent states for a rank-1 codebook, a rank-2 codebook, and the simplest transmission scheme (e.g. single-antenna transmission). The rank-2 codebook represents N (N≤11) states. [Table 22] to [Table 25] illustrate cases where the rank-2 codebook represents 11, 8, 6 and 4 states, respectively in case of one CW transmission, for 4 Tx antennas.

TABLE 22

| One CW | Two CWs |
|---|---|
| Rank-1 | Rank-2 |
| 24-state precoding information | 16-state precoding information |
| Rank-2 | Rank-3 |
| 11-state precoding information | 12-state precoding information |
| Single antenna transmission | Rank-4 |
| (or any transmission scheme using one CW) | 1-state precoding information |
|  | Reserved (3-states) |

TABLE 23

| One CW | Two CWs |
|---|---|
| Rank-1 | Rank-2 |
| 24-state precoding information | 16-state precoding information |
| Rank-2 | Rank-3 |
| 8-state precoding information | 12-state precoding information |
| Single antenna transmission | Rank-4 |
| (or any transmission scheme using one CW) | 1-state precoding information |
|  | Reserved (3-states) |

TABLE 24

| One CW | Two CWs |
|---|---|
| Rank-1 | Rank-2 |
| 24-state precoding information | 16-state precoding information |
| Rank-2 | Rank-3 |
| 6-state precoding information | 12-state precoding information |
| Single antenna transmission | Rank-4 |
| (or any transmission scheme using one CW) | 1-state precoding information |
| Reserved (1-state) | Reserved (3-states) |

TABLE 25

| One CW | Two CWs |
|---|---|
| Rank-1 | Rank-2 |
| 24-state precoding information | 16-state precoding information |
| Rank-2 | Rank-3 |
| 4-state precoding information | 12-state precoding information |
| Single antenna transmission | Rank-4 |
| (or any transmission scheme using one CW) | 1-state precoding information |
| Reserved (3-states) | Reserved (3-states) |

In the above methods for configuring precoding information, examples of configuring a rank-2 code book for 1-CW transmission using a subset of a rank-2 codebook for 2-CW transmission are illustrated in [Table 26] to [Table 31]. [Table 26] to [Table 31] illustrate cases where a rank-2 codebook for 1-CW transmission represents 3, 4, 6, 8, 11 and 12 states, respectively by combining some (N) of 16 states represented by a rank-2 codebook for 2-CW transmission.

TABLE 26

N = 3: 16C3 combinations $$\frac{1}{2}\begin{bmatrix}1 & 0\\ 1 & 0\\ 0 & 1\\ 0 & -j\end{bmatrix}, \frac{1}{2}\begin{bmatrix}1 & 0\\ 0 & 1\\ 1 & 0\\ 0 & 1\end{bmatrix}, \frac{1}{2}\begin{bmatrix}1 & 0\\ 0 & 1\\ 0 & 1\\ 1 & 0\end{bmatrix}$$

TABLE 27

N = 4: 16C4 combinations $$\frac{1}{2}\begin{bmatrix} 1 & 0 \\ 1 & 0 \\ 0 & 1 \\ 0 & -j \end{bmatrix}, \frac{1}{2}\begin{bmatrix} 1 & 0 \\ 1 & 0 \\ 0 & 1 \\ 0 & j \end{bmatrix}, \frac{1}{2}\begin{bmatrix} 1 & 0 \\ -j & 0 \\ 0 & 1 \\ 0 & 1 \end{bmatrix}, \frac{1}{2}\begin{bmatrix} 1 & 0 \\ -j & 0 \\ 0 & 1 \\ 0 & -1 \end{bmatrix}$$

TABLE 28

N = 6: 16C6 combinations $$\frac{1}{2}\begin{bmatrix} 1 & 0 \\ 1 & 0 \\ 0 & 1 \\ 0 & -j \end{bmatrix}, \frac{1}{2}\begin{bmatrix} 1 & 0 \\ 1 & 0 \\ 0 & 1 \\ 0 & j \end{bmatrix}, \frac{1}{2}\begin{bmatrix} 1 & 0 \\ -j & 0 \\ 0 & 1 \\ 0 & 1 \end{bmatrix}, \frac{1}{2}\begin{bmatrix} 1 & 0 \\ -j & 0 \\ 0 & 1 \\ 0 & -1 \end{bmatrix}$$

$$\frac{1}{2}\begin{bmatrix} 1 & 0 \\ -1 & 0 \\ 0 & 1 \\ 0 & -j \end{bmatrix}, \frac{1}{2}\begin{bmatrix} 1 & 0 \\ -1 & 0 \\ 0 & 1 \\ 0 & j \end{bmatrix}$$

TABLE 29

N = 8: 16C8 combinations

Index 0 to 3:
$$\frac{1}{2}\begin{bmatrix} 1 & 0 \\ 1 & 0 \\ 0 & 1 \\ 0 & -j \end{bmatrix}, \frac{1}{2}\begin{bmatrix} 1 & 0 \\ 1 & 0 \\ 0 & 1 \\ 0 & j \end{bmatrix}, \frac{1}{2}\begin{bmatrix} 1 & 0 \\ -j & 0 \\ 0 & 1 \\ 0 & 1 \end{bmatrix}, \frac{1}{2}\begin{bmatrix} 1 & 0 \\ -j & 0 \\ 0 & 1 \\ 0 & -1 \end{bmatrix}$$

Index 4 to 7:
$$\frac{1}{2}\begin{bmatrix} 1 & 0 \\ -1 & 0 \\ 0 & 1 \\ 0 & -j \end{bmatrix}, \frac{1}{2}\begin{bmatrix} 1 & 0 \\ -1 & 0 \\ 0 & 1 \\ 0 & j \end{bmatrix}, \frac{1}{2}\begin{bmatrix} 1 & 0 \\ j & 0 \\ 0 & 1 \\ 0 & 1 \end{bmatrix}, \frac{1}{2}\begin{bmatrix} 1 & 0 \\ j & 0 \\ 0 & 1 \\ 0 & -1 \end{bmatrix}$$

TABLE 30

N = 11: 16C11 = 16C5

Index 0 to 3:
$$\frac{1}{2}\begin{bmatrix} 1 & 0 \\ 1 & 0 \\ 0 & 1 \\ 0 & -j \end{bmatrix}, \frac{1}{2}\begin{bmatrix} 1 & 0 \\ 1 & 0 \\ 0 & 1 \\ 0 & j \end{bmatrix}, \frac{1}{2}\begin{bmatrix} 1 & 0 \\ -j & 0 \\ 0 & 1 \\ 0 & 1 \end{bmatrix}, \frac{1}{2}\begin{bmatrix} 1 & 0 \\ -j & 0 \\ 0 & 1 \\ 0 & -1 \end{bmatrix}$$

Index 4 to 7:
$$\frac{1}{2}\begin{bmatrix} 1 & 0 \\ -1 & 0 \\ 0 & 1 \\ 0 & -j \end{bmatrix}, \frac{1}{2}\begin{bmatrix} 1 & 0 \\ -1 & 0 \\ 0 & 1 \\ 0 & j \end{bmatrix}, \frac{1}{2}\begin{bmatrix} 1 & 0 \\ j & 0 \\ 0 & 1 \\ 0 & 1 \end{bmatrix}, \frac{1}{2}\begin{bmatrix} 1 & 0 \\ j & 0 \\ 0 & 1 \\ 0 & -1 \end{bmatrix}$$

Index 8 to 10:
$$\frac{1}{2}\begin{bmatrix} 1 & 0 \\ 0 & 1 \\ 1 & 0 \\ 0 & 1 \end{bmatrix}, \frac{1}{2}\begin{bmatrix} 1 & 0 \\ 0 & 1 \\ 1 & 0 \\ 0 & -1 \end{bmatrix}, \frac{1}{2}\begin{bmatrix} 1 & 0 \\ 0 & 1 \\ -1 & 0 \\ 0 & 1 \end{bmatrix}$$

TABLE 31

N = 12: 16C12 = 16C4

Index 0 to 3:
$$\frac{1}{2}\begin{bmatrix} 1 & 0 \\ 1 & 0 \\ 0 & 1 \\ 0 & -j \end{bmatrix}, \frac{1}{2}\begin{bmatrix} 1 & 0 \\ 1 & 0 \\ 0 & 1 \\ 0 & j \end{bmatrix}$$

Index 4 to 7:
$$\frac{1}{2}\begin{bmatrix} 1 & 0 \\ -1 & 0 \\ 0 & 1 \\ 0 & -j \end{bmatrix}, \frac{1}{2}\begin{bmatrix} 1 & 0 \\ -1 & 0 \\ 0 & 1 \\ 0 & j \end{bmatrix}$$

Index 8 to 11:
$$\frac{1}{2}\begin{bmatrix} 1 & 0 \\ 0 & 1 \\ 1 & 0 \\ 0 & 1 \end{bmatrix}, \frac{1}{2}\begin{bmatrix} 1 & 0 \\ 0 & 1 \\ 1 & 0 \\ 0 & -1 \end{bmatrix}, \frac{1}{2}\begin{bmatrix} 1 & 0 \\ 0 & 1 \\ -1 & 0 \\ 0 & 1 \end{bmatrix}, \frac{1}{2}\begin{bmatrix} 1 & 0 \\ 0 & 1 \\ -1 & 0 \\ 0 & -1 \end{bmatrix}$$

Index 12 to 15:
$$\frac{1}{2}\begin{bmatrix} 1 & 0 \\ 0 & 1 \\ 0 & 1 \\ 1 & 0 \end{bmatrix}, \frac{1}{2}\begin{bmatrix} 1 & 0 \\ 0 & 1 \\ 0 & -1 \\ 1 & 0 \end{bmatrix}, \frac{1}{2}\begin{bmatrix} 1 & 0 \\ 0 & 1 \\ 0 & 1 \\ -1 & 0 \end{bmatrix}, \frac{1}{2}\begin{bmatrix} 1 & 0 \\ 0 & 1 \\ 0 & -1 \\ -1 & 0 \end{bmatrix}$$

The precoding information field may be configured as illustrated in [Table 32], [Table 33], and [Table 34], taking the above description into comprehensive account. [Table 32] illustrates contents of a 3-bit precoding information field for 2 Tx antennas, [Table 33] illustrates contents of a 5-bit precoding information field for 4 Tx antennas, and [Table 34] illustrates contents of a 6-bit precoding information field for 4 Tx antennas.

TABLE 32

| | One codeword:<br>Codeword 0 enabled<br>Codeword 1 disabled | | Two codeword:<br>Codeword 0 enabled<br>Codeword 1 enabled |
|---|---|---|---|
| Bit field mapped to index | Message | Bit field mapped to index | Message |
| 0 | 1 layer: single antenna | 0 | 2 layers: Precoding corresponding to precoding matrix $\frac{1}{\sqrt{2}}\begin{bmatrix} 1 & 0 \\ 0 & 1 \end{bmatrix}$ |
| 1 | 1 layer: Precoding corresponding to precoding matrix $[1\ 1]^T/\sqrt{2}$ | 1-7 | reserved |
| 2 | 1 layer: Precoding corresponding to precoding matrix $[1\ -1]^T/\sqrt{2}$ | | |
| 3 | 1 layer: Precoding corresponding to precoding matrix $[1\ j]^T/\sqrt{2}$ | | |
| 4 | 1 layer: Precoding corresponding to precoding matrix $[1\ -j]^T/\sqrt{2}$ | | |
| 5 | 1 layer: Precoding corresponding to precoding matrix $[1\ 0]^T/\sqrt{2}$ | | |
| 6 | 1 layer: Precoding corresponding to precoding matrix $[0\ 1]^T/\sqrt{2}$ | | |
| 7 | reserved | | |

TABLE 33

| Bit field mapped to index | One codeword: Codeword 0 enabled Codeword 1 disabled Message | Bit field mapped to index | Two codeword: Codeword 0 enabled Codeword 1 enabled Message |
|---|---|---|---|
| 0 | 1 layer: single antenna | 0 | 2 layers: TPMI 0 |
| 1 | 1 layer: TPMI 0 | 1 | 2 layers: TPMI 1 |
| 2 | 1 layer: TPMI 1 | 2 | 2 layers: TPMI 2 |
| 3 | 1 layer: TPMI 2 | 3 | 2 layers: TPMI 3 |
| 4 | 1 layer: TPMI 3 | 4 | 2 layers: TPMI 4 |
| 5 | 1 layer: TPMI 4 | 5 | 2 layers: TPMI 5 |
| 6 | 1 layer: TPMI 5 | 6 | 2 layers: TPMI 6 |
| 7 | 1 layer: TPMI 6 | 7 | 2 layers: TPMI 7 |
| 8 | 1 layer: TPMI 7 | 8 | 2 layers: TPMI 8 |
| 9 | 1 layer: TPMI 8 | 9 | 2 layers: TPMI 9 |
| 10 | 1 layer: TPMI 9 | 10 | 2 layers: TPMI 10 |
| 11 | 1 layer: TPMI 10 | 11 | 2 layers: TPMI 11 |
| 12 | 1 layer: TPMI 11 | 12 | 2 layers: TPMI 12 |
| 13 | 1 layer: TPMI 12 | 13 | 2 layers: TPMI 13 |
| 14 | 1 layer: TPMI 13 | 14 | 2 layers: TPMI 14 |
| 15 | 1 layer: TPMI 14 | 15 | 2 layers: TPMI 15 |
| 16 | 1 layer: TPMI 15 | 16 | 3 layers: TPMI 0 |
| 17 | 1 layer: TPMI 16 | 17 | 3 layers: TPMI 1 |
| 18 | 1 layer: TPMI 17 | 18 | 3 layers: TPMI 2 |
| 19 | 1 layer: TPMI 18 | 19 | 3 layers: TPMI 3 |
| 20 | 1 layer: TPMI 19 | 20 | 3 layers: TPMI 4 |
| 21 | 1 layer: TPMI 20 | 21 | 3 layers: TPMI 5 |
| 22 | 1 layer: TPMI 21 | 22 | 3 layers: TPMI 6 |
| 23 | 1 layer: TPMI 22 | 23 | 3 layers: TPMI 7 |
| 24 | 1 layer: TPMI 23 | 24 | 3 layers: TPMI 8 |
| 25 | 2 layers: TPMI a | 25 | 3 layers: TPMI 9 |
| 26 | 2 layers: TPMI b | 26 | 3 layers: TPMI 10 |
| 27 | 2 layers: TPMI c | 27 | 3 layers: TPMI 11 |
| 28 | 2 layers: TPMI d | 28 | 4 layers: Precoding corresponding to precoding matrix $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |
| 29 | 2 layers: TPMI e | 29-31 | Reserved |
| 30 | 2 layers: TPMI f | | |
| 31 | Reserved | | |

TABLE 34

| Bit field mapped to index | One codeword: Codeword 0 enabled Codeword 1 disabled Message | Bit field mapped to index | Two codeword: Codeword 0 enabled Codeword 1 enabled Message |
|---|---|---|---|
| 0 | 1 layer: single antenna | 0 | 2 layers: TPMI 0 |
| 1 | 1 layer: TPMI 0 | 1 | 2 layers: TPMI 1 |
| 2 | 1 layer: TPMI 1 | 2 | 2 layers: TPMI 2 |
| 3 | 1 layer: TPMI 2 | 3 | 2 layers: TPMI 3 |
| 4 | 1 layer: TPMI 3 | 4 | 2 layers: TPMI 4 |
| 5 | 1 layer: TPMI 4 | 5 | 2 layers: TPMI 5 |
| 6 | 1 layer: TPMI 5 | 6 | 2 layers: TPMI 6 |
| 7 | 1 layer: TPMI 6 | 7 | 2 layers: TPMI 7 |
| 8 | 1 layer: TPMI 7 | 8 | 2 layers: TPMI 8 |
| 9 | 1 layer: TPMI 8 | 9 | 2 layers: TPMI 9 |
| 10 | 1 layer: TPMI 9 | 10 | 2 layers: TPMI 10 |
| 11 | 1 layer: TPMI 10 | 11 | 2 layers: TPMI 11 |
| 12 | 1 layer: TPMI 11 | 12 | 2 layers: TPMI 12 |
| 13 | 1 layer: TPMI 12 | 13 | 2 layers: TPMI 13 |
| 14 | 1 layer: TPMI 13 | 14 | 2 layers: TPMI 14 |
| 15 | 1 layer: TPMI 14 | 15 | 2 layers: TPMI 15 |
| 16 | 1 layer: TPMI 15 | 16 | 3 layers: TPMI 0 |
| 17 | 1 layer: TPMI 16 | 17 | 3 layers: TPMI 1 |
| 18 | 1 layer: TPMI 17 | 18 | 3 layers: TPMI 2 |
| 19 | 1 layer: TPMI 18 | 19 | 3 layers: TPMI 3 |
| 20 | 1 layer: TPMI 19 | 20 | 3 layers: TPMI 4 |
| 21 | 1 layer: TPMI 20 | 21 | 3 layers: TPMI 5 |
| 22 | 1 layer: TPMI 21 | 22 | 3 layers: TPMI 6 |
| 23 | 1 layer: TPMI 22 | 23 | 3 layers: TPMI 7 |
| 24 | 1 layer: TPMI 23 | 24 | 3 layers: TPMI 8 |
| 25 | 2 layers: TPMI 1 | 25 | 3 layers: TPMI 9 |
| 26 | 2 layers: TPMI 2 | 26 | 3 layers: TPMI 10 |
| 27 | 2 layers: TPMI 3 | 27 | 3 layers: TPMI 11 |
| 28 | 2 layers: TPMI 4 | 28 | 4 layers: Precoding corresponding to precoding matrix $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |
| 29 | 2 layers: TPMI 5 | 29-63 | Reserved |
| 30 | 2 layers: TPMI 6 | | |
| 31 | 2 layers: TPMI 7 | | |
| 32 | 2 layers: TPMI 8 | | |
| 33 | 2 layers: TPMI 9 | | |
| 34 | 2 layers: TPMI 10 | | |
| 35 | 2 layers: TPMI 11 | | |
| 36 | 2 layers: TPMI 12 | | |
| 37 | 2 layers: TPMI 13 | | |
| 38 | 2 layers: TPMI 14 | | |
| 39 | 2 layers: TPMI 15 | | |
| 40-63 | Reserved | | |

Control information (a DCI format) for uplink MCW MIMO transmission in the 3GPP LTE-A system may be configured as follows, based on the above description.

The legacy 3GPP LTE standard (e.g. 3GPP LTE Release-8) defines a single-antenna port transmission mode for uplink transmission and defines DCI format 0 to support the single-antenna port transmission mode. DCI format 0 may include 'Flag for format 0/format 1A differentiation', 'Hopping flag', 'Resource block allocation (for contiguous allocation) and hopping resource allocation', 'MCS and redundancy version', 'NDI', 'TPC command for scheduled PUSCH', 'Cyclic shift for DMRS', and 'CQI request'.

Contiguous resource allocation and single-antenna transmission may be supported using DCI format 0. Meanwhile, non-contiguous resource allocation and uplink spatial multiplexing transmission using up to 4 transmission layers may be introduced to LTE-A uplink transmission. To support this new uplink transmission scheme, it is necessary to define a new transmission mode and a new DCI format for control signaling of the new transmission mode.

Considering uplink SU-MIMO spatial multiplexing, a closed-loop spatial multiplexing transmission mode using multiple TBs and a closed-loop spatial multiplexing transmission mode using a single TB may be newly defined as uplink transmission modes. In addition, the uplink single-antenna transmission mode as defined by 3GPP LTE Release-8 needs to be supported as a default transmission mode.

In the multi-TB closed-loop spatial multiplexing transmission mode, transmission of up to two TBs from a scheduled UE may be considered. Each individual TB may have an MCS level. To support dynamic rank adaptation, two MCS indicators for the two TBs may be included in uplink scheduling control information (a DCI format). In addition, precoding information for all transmission ranks may be included in the control information.

In the single-TB closed-loop spatial multiplexing transmission mode, support of rank-1 beamforming having low control signal overhead may be considered, similarly to downlink MIMO transmission of 3GPP LTE Release-8. For this transmission mode, uplink scheduling control information (a DCI format) may include one MCS level and rank-1 precoding information.

The single-antenna uplink transmission mode, which is a default transmission mode, may be defined as an uplink transmission mode available before an eNB knows the Tx antenna configuration of a UE. This transmission mode may be used as a fall-back transmission mode of the 3GPP LTE Release-10 uplink transmission mode.

To support the above LTE-A uplink SU-MIMO transmission modes, new uplink scheduling control information (a new DCI format) needs to be defined. Requirements of control signaling to support uplink SU-MIMO transmission will be described below with reference to [Table 35].

TABLE 35

| Contents | | Number of bit | | Comment |
|---|---|---|---|---|
| | | Mode A | Mode B | |
| Flag for UL/DL format differentiation | | 0/1 | 0/1 | |
| Hopping flag | | 0/1 | 0/1 | |
| Resource block assignment | | N + α | N + α | * N-bit for Rel-8 UL allocation method<br>* To support new method of resource allocation, α-bit can be added |
| $1^{st}$ CW | MCS and RV | 5 | 5 | |
| | NDI | 1 | 1 | |
| $2^{nd}$ CW | MCS and RV | 4-5 | — | |
| | NDI | 1 | — | |
| TB to codeword swap flag | | 1 | — | |
| Precoding information | | M | Less than M | 2Tx: 3-bit, 4Tx: 6-bit |
| TPC command for scheduled PUSCH | | 2 + β | 2 + β | * To support per antenna power control, β-bit can be added. |
| Cyclic shift for DMRS | | 3 | 3 | |
| OCC | | 0/1 | 0/1 | |
| UL index (for TDD) | | 2 | 2 | |
| Downlink Assignment Index (for TDD) | | 2 | 2 | |
| CQI request | | 1 | 1 | |

[Table 35] illustrates an example of a new DCI format for PUSCH transmission in the LTE-A system. In [Table 35], mode A is the multi-TB closed-loop spatial multiplexing mode and mode B is the single-TB closed-loop spatial multiplexing mode. Now a detailed description will be given of each field in the DCI format of [Table 35].

The 'Flag for UL/DL format differentiation' field provides control information indicating whether the DCI format is for UL transmission or DL transmission. Since the DCI format for uplink SU-MIMO transmission has the same size as the DCI format for downlink SU-MIMO transmission, the number of PDCCH blind decodings can be reduced. The number of bits of the 'Flag for UL/DL format differentiation' field is 0 or 1. If this field is included in the DCI format, the field has 1 bit. When needed, this field is not included in the DCI format.

When non-contiguous resource allocation is used in the LTE-A system, the 'Hopping flag and resource block assignment' field may not be needed because a frequency hopping mode may operate according to non-contiguous resource allocation. If a resource block assignment field for non-contiguous assignment has the same size as a resource block assignment field for LTE Realease-8 uplink transmission, a new DCI format having the same size as the existing DCI format 0 may be designed. Non-contiguous resource assignment may be used for uplink SU-MIMO transmission. The number of bits of the 'Hopping flag and resource block assignment' field is 0 or 1. If this field is included in the DCI format, the field has 1 bit. When needed, this field is not included in the DCI format.

When layer shifting is not used for uplink SU-MIMO transmission, a channel carrying each CW is independent. For example, channel environments in which CWs are transmitted may be very different due to imbalance between transmission antennas and antenna gains. Therefore, independent 'MCS and RV' and 'NDI' fields may be defined for each CW for uplink SU-MIMO transmission, like control information for downlink MIMO transmission in the LTE Release-8 system. The 'MCS and RV' and 'NDI' fields for the first CW may be 5 bits and 1 bit long, respectively, as in the conventional DCI format 0. Like those of the first CW, the 'MCS and RV' and 'NDI' fields for the second CW may be 5 bits and 1 bit long, respectively. Or the 'MCS and RV' field for the second CW may have fewer than 5 bits, as described before.

Meanwhile, if HARQ transmission is performed in a non-blanking fashion, new data may be transmitted for a CW for which an ACK has been received and retransmission data may be transmitted for a CW for which a NACK has been received. On the other hand, if HARQ transmission is performed in a blanking fashion, new data may be transmitted if ACKs have been received for two CWs. If an ACK has been received for one of the CWs and a NACK has been received for the other CW, retransmission may be attempted for the CW for which the NACK has been received, while no transmission may be performed for the CW for which the ACK has been received. If NACKs have been received for the two CWs, retransmission may be performed for the two CWs. To support non-blanking HARQ retransmission, an NDI field for the second CW is needed in the DCI format.

Meanwhile, if one CW is mapped to one or two layers, it is necessary to indicate whether a TB is enabled or disabled in order to support transmission of one of two TBs. As described before, to indicate the state of a disabled TB in uplink SU-MIMO transmission, some state of an MCS table may be interpreted differently or a state indicating TB disabled may be added to the MCS table. For example, it may indicate that a corresponding TB is disabled by signaling MCS index #0 or #28.

According to the Precoding Information' field, a 3-bit precoding codebook may be used for a UE with 2 Tx antennas for uplink spatial multiplexing, and a 6-bit precoding codebook may be used for a UE with 4 Tx antennas for uplink spatial multiplexing. The precoding information field may be configured according to various embodiments of the present invention. For example, precoding information may be efficiently configured as illustrated in [Table 12] to [Table 15], as described before.

The 'TB to Codeword swap flag' field provides control information indicating whether swapping occurs to TB to codeword mapping. When a specific CW is transmitted through a specific physical antenna by mapping based on a codebook structure for LTE-A uplink MIMO transmission, spatial diversity can be increased on a subframe basis through swapping.

The 'Cyclic shift for DMRS' field indicates a cyclic shift value applied to an uplink DMRS. Uplink DMRSs may be multiplexed by separating the uplink DMRSs using cyclic shifts during multi-layer channel estimation. When cyclic shift indexes are assigned to multiple layers, the minimum number of bits required to indicate a cyclic shift is 3 bits. If a cyclic shift is indicated for one layer, cyclic shift indexes may be allocated to other layers according to a predefined rule.

The 'OCC' field indicates an orthogonal cover code applied to uplink DMRSs. The use of an OCC may increase orthogonal resources for uplink DMRSs.

'TPC command for scheduled PUSCH' includes a transmission power command for transmission of a scheduled PUSCH. If a UE has multiple antennas, TPC commands may be applied to the respective antennas.

The 'UL index (for TDD)' field may indicate a subframe index set for uplink transmission in a specific uplink-downlink configuration, when a radio frame is configured in TDD mode.

The 'Downlink Assignment Index (for TDD)' field may specify the total number of subframes set for PDSCH transmission in a specific uplink-downlink configuration, when a radio frame is configured in the TDD mode.

The 'CQI request' field indicates a request for reporting CQI, a PMI, and an RI non-periodically on a PUSCH. If the 'CQI request' field is set to 1, a UE transmits a non-periodical CQI, PMI, and RI report on a PUSCH.

Control information that schedules uplink SU-MIMO transmission can be efficiently provided, while reducing signaling overhead, by means of the new DCI format.

Figure 16:
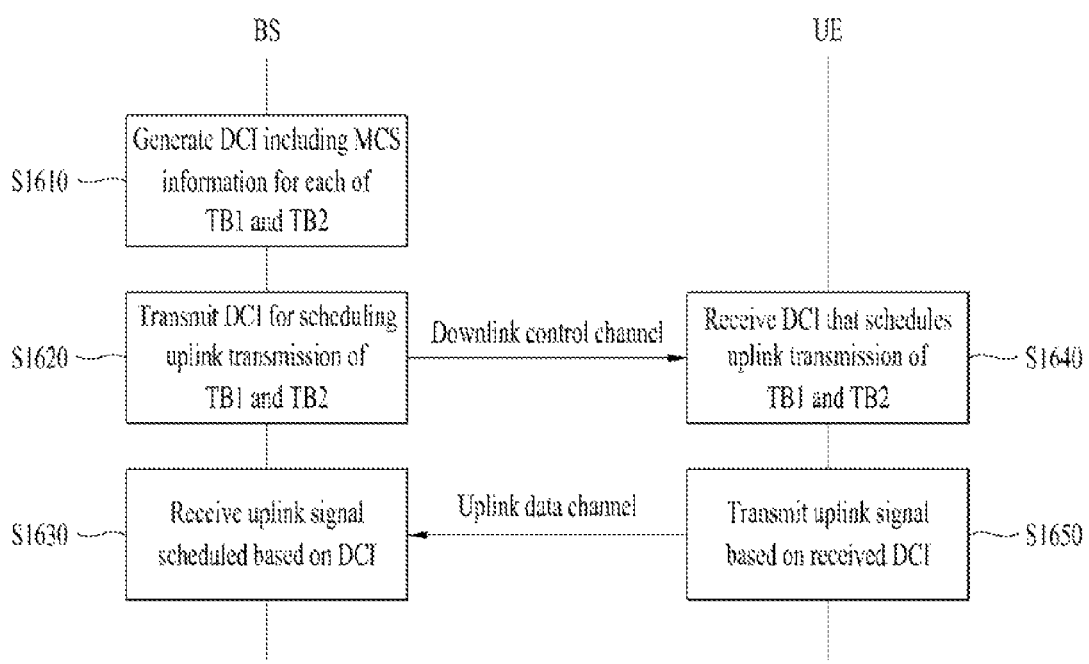
FIG. 16 is a flowchart illustrating a method for providing control information that schedules uplink multi-antenna transmission according to an embodiment of the present invention.

FIG. 16 illustrates a method for providing control information that schedules uplink multi-antenna transmission according to an embodiment of the present invention.

First, an operation of an eNB will be described. The eNB may generate DCI including MCS information for each of first and second TBs, TB1 and Tb2 (S1610). The DCI is control information that schedules uplink transmission of at least one of the TBs, TB1 and TB2. The eNB may transmit the generated DCI to a UE on a PDCCH (S1620). The eNB may receive an uplink signal scheduled according to the DCI on a PUSCH from the UE (S1630).

Meanwhile, the UE may receive the DCI transmitted in step S1620 (S1640) and transmit at least one of the TBS, TB1 and TB2 on the PUSCH to the eNB according to the scheduling information included in the DCI (S1650).

If the MCS information for TB1 or TB2 has a specific value (e.g. MCS index #0 or #28), it may indicate that the corresponding TB is disabled.

Figure 17:
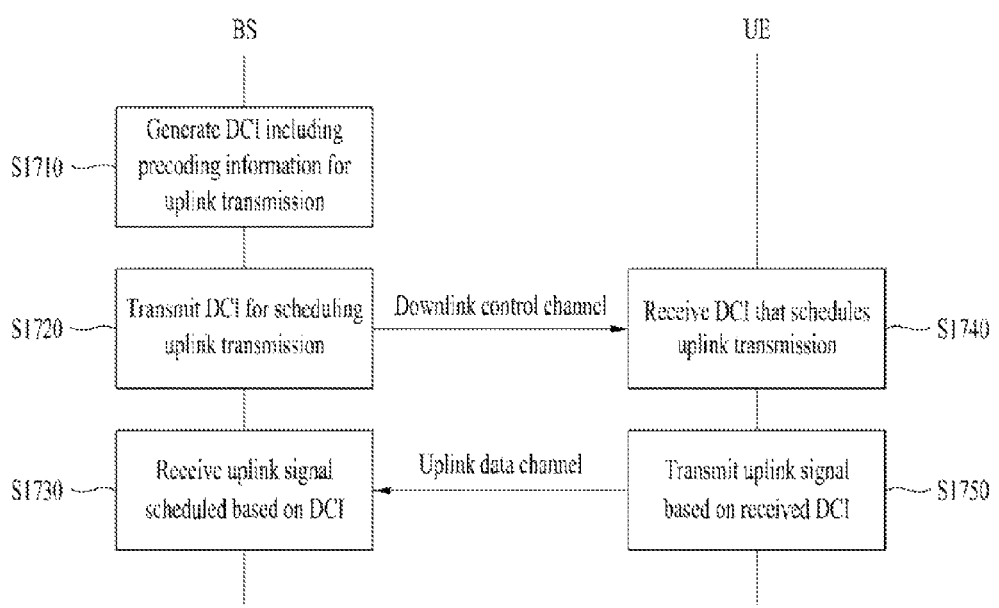
FIG. 17 is a flowchart illustrating a method for providing control information that schedules uplink multi-antenna transmission according to another embodiment of the present invention.

FIG. 17 illustrates a method for providing control information that schedules uplink multi-antenna transmission according to another embodiment of the present invention.

An operation of an eNB will first be described below. The eNB may generate DCI including precoding information that specifies a transmission rank and a precoding matrix for uplink transmission (S1710). The DCI is control information that schedules uplink transmission. The eNB may transmit the generated DCI to a UE on a PDCCH (S1720). The eNB may receive an uplink signal scheduled according to the DCI on a PUSCH from the UE (S1730).

Meanwhile, the UE may receive the DCI transmitted in S1720 (S1740) and transmit uplink data on the PUSCH to the eNB according to the transmission rank and the precoding matrix indicated by the scheduling information included in the DCI (S1750).

The size of precoding information included in the DCI may be determined based on the number of multiple antennas and the number of precoding matrices available according to an uplink transmission rank. In addition, the precoding information may be configured so as to indicate a different transmission rank and precoding matrix according to the number of enabled CWs.

For 2 Tx antennas, when one CW is enabled, rank-1 transmission is possible and when two CWs are enabled, rank-2 transmission is possible. For 4 Tx antennas, when one CW is enabled, rank-1 transmission or rank-2 transmission is possible and when two CWs are enabled, rank-2 transmission, rank-3 transmission, or rank-4 transmission is possible.

The number of enabled CWs is equal to that of enabled TBs. Disabling of a TB may be indicated by a specific value (e.g. MCS index #0 or #28) set in an MCS field for each TB included in DCI as in Method 1, Method 2, and Method 3. Therefore, precoding information may be interpreted differently according to the number of enabled CWs. The size of precoding information may be determined based on a larger number of states according to the number of enabled CWs.

For 2 uplink Tx antennas, when one CW is enabled, precoding information should be able to represent 6 states indicating 6 precoding matrices for rank 1. When two CWs are enabled, the precoding information should be able to represent one state indicating one precoding matrix for rank 2. Therefore, the size of precoding information may be 3 bits (8 states). As described before, remaining states other than states indicating transmission ranks and precoding matrices may be reserved or used to represent other information.

For 4 uplink Tx antennas, when one CW is enabled, precoding information should be able to represent 24 states indicating 24 precoding matrices for rank 1 and 16 states indicating 16 precoding matrices for rank 2 (a total of 40 states). When two CWs are enabled, the precoding information should be able to represent 16 states indicating 16 precoding matrices for rank 2, 12 states indicating 12 precoding matrices for rank 3, and one state indicating one precoding matrix for rank 4 (a total of 29 states). Therefore, the size of precoding information may be 6 bits (64 states). As described before, remaining states other than states indicating transmission ranks and precoding matrices may be reserved or used to represent other information.

A new DCI format may be configured by using the method for indicating a disabled TB (FIG. 16) and the method for configuring precoding information (FIG. 17) in combination, for uplink SU-MIMO transmission. In addition, DCI may be configured to schedule uplink multi-antenna transmission by applying one or more of the foregoing various embodiments of the present invention simultaneously.

Figure 18:
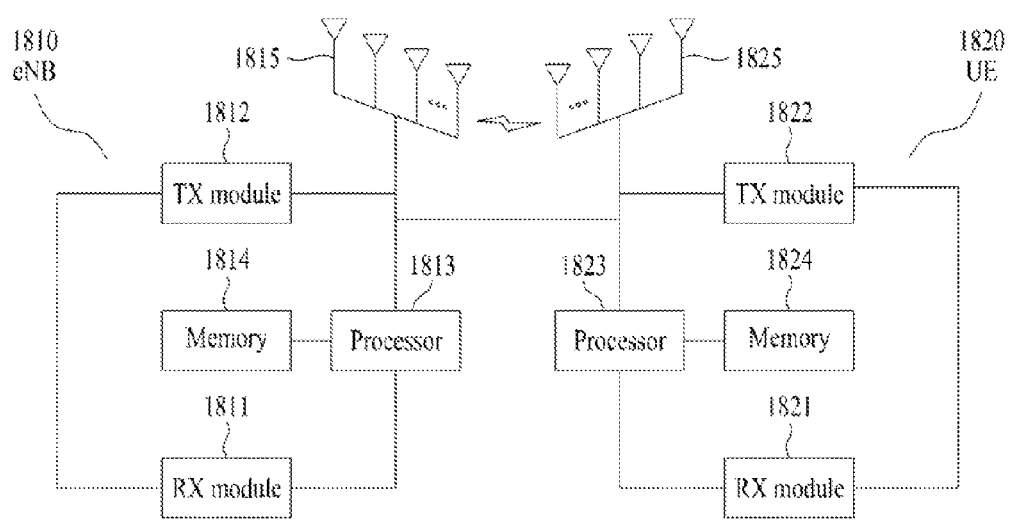
FIG. 18 is a block diagram of an evolved Node B (eNB) and a User Equipment (UE) according to the present invention.

FIG. 18 is a block diagram of an eNB and a UE according to an embodiment of the present invention.

An eNB 1810 may include an Rx module 1811, a Tx module 1812, a processor 1813, a memory 1814, and antennas 1815. The Rx module 1811 may receive data and control signals from the outside (e.g. a UE). The Tx module 1812 may transmit data and control signals to the outside (e.g. a UE). The processor 1813 may be connected to various components of the eNB 1810 such as the Rx module 1811, the Tx module 1812, and the memory 1814 in terms of communication and may provide overall control to the eNB 1810 and its components. The eNB 1810 may support MIMO transmission and reception by a plurality of antennas 1815.

In accordance with an embodiment of the present invention, the eNB 1810 may provide control information that schedules uplink multi-antenna transmission to the UE. The processor 1813 of the eNB 1810 may be configured so as to generate DCI including MCS information for each of first and second TBs. The processor 1813 may generate DCI including precoding information that specifies a transmission rank and a precoding matrix for uplink transmission. The processor 1813 may also transmit the DCI that schedules uplink transmission on a downlink control channel through the Tx module 1812. The processor 1813 may receive an uplink signal scheduled based on the DCI on an uplink data channel through the Rx module 1811.

If MCS information for one of the first and second TBs has a predetermined value (e.g. MCS index #0 or #28), it may indicate the corresponding TB is disabled. The size of the precoding information may be determined according to the number of multiple antennas and the number of precoding matrices available according to an uplink transmission rank.

Besides, the processor 1813 may process information received at the eNB 1810 and information to be transmitted to the outside. The memory 1814 may store processed information for a predetermined time and may be replaced by a component such as a buffer (not shown).

While the eNB 1810 has been described as an uplink receiver in FIG. 18, the same thing may apply to a Relay Node (RN) that is also an uplink receiver.

Meanwhile, a UE 1820 may include an Rx module 1821, a Tx module 1822, a processor 1823, a memory 1824, and antennas 1825. The Rx module 1821 may receive data and control signals from the outside (e.g. an eNB). The Tx module 1822 may transmit data and control signals to the outside (e.g. an eNB). A processor 1823 may be connected to various components of the UE 1820 such as the Rx module 1821, the Tx module 1822, and the memory 1824 in terms of communication and may provide overall control to the UE 1820 and its component. The UE 1820 may support MIMO transmission and reception by a plurality of antennas 1825.

In accordance with an embodiment of the present invention, the UE 1820 may perform uplink multi-antenna transmission. The processor 1823 of the UE 1820 may be configured so as to receive DCI that schedules uplink transmission on a downlink control channel through the Rx module 1821. The processor 1823 may transmit an uplink signal scheduled according to the received DCI on an uplink data channel through the Tx module 1822.

The DCI includes MCS information for each of first and second TBs. When MCS information for one of the first and second TBs has a predetermined value (e.g. MCS index #0 or #28), it may indicate that the corresponding TB is disabled. In addition, the DCI may include precoding information that specifies a transmission rank and a precoding matrix for uplink transmission. The size of the precoding information may be determined according to the number of multiple antennas and the number of precoding matrices available according to an uplink transmission rank.

Besides, the processor 1823 may process information received at the UE 1820 and information to be transmitted to the outside. The memory 1824 may store processed information for a predetermined time and may be replaced by a component such as a buffer (not shown).

While the UE 1820 has been described as an uplink transmitter in FIG. 18, the same thing may apply to an RN that is also an uplink transmitter.

While components of the eNB and the UE according to the foregoing various embodiments of the present invention are not shown for clarity of description in relation to the BS and the UE illustrated in FIG. 18, it is clearly to be understood that the various embodiment of the present invention can be implemented in the eNB and the UE.

The embodiments of the present invention may be achieved by various means, for example, hardware, firmware, software, or a combination thereof In a hardware configuration, the methods according to the embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method of transmitting downlink control information (DCI) by a base station, the method comprising:
   generating DCI for uplink scheduling including multiple modulation and coding scheme (MCS) fields each indicating a combination of a modulation order and a redundancy version for each of multiple transport blocks (TBs);
   transmitting the generated DCI via a downlink control channel; and
   receiving one or more enabled TBs among the multiple TBs via a uplink data channel according to the DCI for uplink scheduling,
   wherein if a TB among the multiple TBs is disabled, a MCS field for the disabled TB corresponds to either a highest modulation order with a lowest redundancy version or a lowest modulation order with the lowest redundancy version among predefined modulation orders and redundancy versions.

2. The method of claim 1, wherein each of the MCS fields is 5 bits long.

3. The method of claim 1, wherein the highest modulation order with the lowest redundancy version corresponds to a largest transport block size, and the lowest modulation order with the lowest redundancy version corresponds to a smallest transport block size.

4. The method of claim 1, wherein a value of the MCS field for the disabled TB corresponds to either '0' or '28'.

5. The method of claim 1, wherein the DCI further includes a precoding information field indicating a number of transmission layers and a precoding matrix for uplink transmission.

6. The method of claim 1, wherein the downlink control channel is a physical downlink control channel (PDCCH) and the uplink data channel is a physical uplink shared channel (PUSCH).

7. A method of receiving downlink control information (DCI) by a user equipment, the method comprising:
   receiving, via a downlink control channel, DCI for uplink scheduling including multiple modulation and coding scheme (MCS) fields each indicating a combination of a modulation order and a redundancy version for each of multiple transport blocks (TBs); and
   transmitting one or more enabled TBs among the multiple TBs via a uplink data channel according to the DCI for uplink scheduling,
   wherein if a TB among the multiple TBs is disabled, a MCS field for the disabled TB corresponds to either a highest modulation order with a lowest redundancy version or a lowest modulation order with the lowest redundancy version among predefined modulation orders and redundancy versions.

8. The method of claim 7, wherein each of the MCS fields is 5 bits long.

9. The method of claim 7, wherein the highest modulation order with the lowest redundancy version corresponds to a largest transport block size, and the lowest modulation order with the lowest redundancy version corresponds to a smallest transport block size.

10. The method of claim 7, wherein a value of the MCS field for the disabled TB corresponds to either '0' or '28'.

11. The method of claim 7, wherein the DCI further includes a precoding information field indicating a number of transmission layers and a precoding matrix for uplink transmission.

12. The method of claim 7, wherein the downlink control channel is a physical downlink control channel (PDCCH) and the uplink data channel is a physical uplink shared channel (PUSCH).

13. A base station comprising:
   a processor configured to generate downlink control information (DCI) for uplink scheduling including multiple modulation and coding scheme (MCS) fields each indicating a combination of a modulation order and a redundancy version for each of multiple transport blocks (TBs);
   a transmitter configured to transmit the generated DCI via a downlink control channel; and
   a receiver configured to receive one or more enabled TBs among the multiple TBs via a uplink data channel according to the DCI for uplink scheduling,
   wherein if a TB among the multiple TBs is disabled, a MCS field for the disabled TB corresponds to either a highest modulation order with a lowest redundancy version or a lowest modulation order with the lowest redundancy version among predefined modulation orders and redundancy versions.

14. A user equipment comprising:
   a receiver configured to receive, via a downlink control channel, downlink control information (DCI) for uplink scheduling including multiple modulation and coding scheme (MCS) fields each indicating a combination of a modulation order and a redundancy version for each of multiple transport blocks (TBs);
   a transmitter configured to transmit one or more enabled TBs among the multiple TBs via a uplink data channel according to the DCI for uplink scheduling; and
   a processor configured to control the receiver and the transmitter,
   wherein if a TB among the multiple TBs is disabled, a MCS field for the disabled TB corresponds to either a highest modulation order with a lowest redundancy version or a lowest modulation order with the lowest redundancy version among predefined modulation orders and redundancy versions.

* * * * *